US007100167B2

(12) United States Patent
Novik et al.

(10) Patent No.: US 7,100,167 B2
(45) Date of Patent: Aug. 29, 2006

(54) METHOD AND APPARATUS FOR CREATING TEMPLATES

(75) Inventors: Lev Novik, Bellevue, WA (US); Patrick R. Kenny, Redmond, WA (US); Alexander E. Nosov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 930 days.

(21) Appl. No.: 10/081,442

(22) Filed: Feb. 19, 2002

(65) Prior Publication Data

US 2003/0101287 A1    May 29, 2003

Related U.S. Application Data

(63) Continuation-in-part of application No. 09/847,534, filed on May 1, 2001.

(51) Int. Cl.
G06F 9/46    (2006.01)
(52) U.S. Cl. .................. 719/318; 719/315; 719/316
(58) Field of Classification Search ............ 719/315, 719/316, 318; 717/108, 106, 116, 117, 114
See application file for complete search history.

(56) References Cited

U.S. PATENT DOCUMENTS

| 5,555,415 | A |   | 9/1996  | Allen |
| 5,632,035 | A | * | 5/1997  | Goodwin ............... 717/126 |
| 5,715,460 | A | * | 2/1998  | Acker et al. ............ 717/140 |
| 5,724,589 | A | * | 3/1998  | Wold .................... 719/318 |
| 5,761,502 | A |   | 6/1998  | Jacobs |
| 5,822,583 | A |   | 10/1998 | Tabuchi |
| 5,838,918 | A | * | 11/1998 | Prager et al. ........... 709/221 |
| 5,864,700 | A | * | 1/1999  | Barton et al. ........... 717/156 |
| 6,032,152 | A | * | 2/2000  | Pearson ................. 707/103 R |
| 6,138,171 | A |   | 10/2000 | Walker |
| 6,195,794 | B1| * | 2/2001  | Buxton .................. 717/108 |
| 6,275,957 | B1| * | 8/2001  | Novik et al. ............ 714/39 |
| 6,336,139 | B1|   | 1/2002  | Feridun et al. |
| 6,405,368 | B1| * | 6/2002  | Freyburger ............. 717/140 |
| 6,598,225 | B1|   | 7/2003  | Curtis et al. |
| 6,601,193 | B1|   | 7/2003  | Liebau |
| 6,675,228 | B1|   | 1/2004  | Bahrs et al. |
| 6,760,905 | B1| * | 7/2004  | Hostetter et al. ........ 717/148 |
| 6,826,761 | B1|   | 11/2004 | Damon et al. |
| 6,829,771 | B1|   | 12/2004 | Bahrs et al. |
| 6,889,373 | B1| * | 5/2005  | Fukase et al. .......... 717/106 |

OTHER PUBLICATIONS

IBM TDB, "Dynamic Template Replacement Capability in Officevision/2", 1991, pp. 22-23.*
"Template Definition Language (TDL)", Apr. 2000, http://xml.coverpage.org/tdl.html.*
"MSFT_TemplateBuilder", Mar. 2005, http://msdn.microsoft.com/library/default.asp?url=/library/en-us/wmisdk/wmi/msft_templatebuilder.asp.*

(Continued)

Primary Examiner—William Thomson
Assistant Examiner—Fahd Patel
(74) Attorney, Agent, or Firm—Lee & Hayes, PLLC

(57) ABSTRACT

A template creator creates a template class that stores at least one template parameter. The template creator also specifies at least one additional object to be created when an instance of the template class is created. A template user initiates the creation of a new instance of the template class. If an error occurs during the creation of the new instance of the template class, the template user receives a report identifying the error.

4 Claims, 10 Drawing Sheets

OTHER PUBLICATIONS

G. McCluskey, "Template Instantiation for C++", ACM, 1992, pp. 47-56.*

Y. Smaragdakis, et al, "Mixin-Based Programming in C++", 2000, pp. (15), http://citeseer.ist.psu.edu/smaragdakis00mixinbased.html.*

D. Batory et al, "Building Product-Lines with Mixin-Layers", 1999, pp. (5), http://citeseer.ist.psu.edu/batory99building.html.*

Sun Microsystems, Inc., Inner Classes Specification, Feb. 1997, http://sunsite.tus.ac.jp/java/docs/jdk1.1/innerclasses.pdf.*

G. Hedin et al, "On the Role of Language Construct fo Framework Design", ACM, 2000, pp. (5).*

P. Eugster, et al "On Objects and Events", ACM, 2001, pp. 254-269.*

Google Groups, "Can a template class have a nested template class?" (2001), "Serializable anonymous inner classes?" (1999).*

"Composite events for network event correlation", Liu et al., Integrated Network Management VI, Proceedings of the Sixth IFIP/IEEE International Symposium on Integrated Network Management, May 24-28, 1999, pp. 247-260.

"High speed and robust event correlation", Yemini et al., IEEE Communications Magazine, May 1996, vol. 34, No. 5, pp. 82-90.

"A rule-based event manager for the Tivoli/Enterprise console", Bescos et al., Practical Application of PROLOG, Proceedings of the Third International Conference on the Practical Application of Prolog, Apr. 3-6, 1995, pp. 43-51.

"GRACE: building next generation event correlation services", Jakobson et al., Proceedings of Network Operations and Management Symposium, Apr. 10-14, 2000, pp. 701-714.

"A framework for distributed event correlation", Albaghdadi et al., Proceedings of the Seventeenth IASTED International Conference on Applied Informatics, Feb. 15-18, 1999, pp. 467-470.

"A proposal of event correlation for distributed network fault management and its evaluation", Kato et al., IEICE Transactions on Communications, Jun. 1999, vol. E82-B, No. 6, pp. 859-867.

Abstract for "A study on distributed network management with event correlation", Ika, T., Record of Electrical and Communication Engineering Conversazione Tohoku University, Aug. 1998, vol. 67, No. 1, pp. 458-459.

Jaworski, Jamie. "Java Developer's Guide." Chapter 3, Using the Java Developer' Kit. 1996. pp. 26-42.

Merriam-Webster, Inc. "Merriam Webster's Collegiate Dictionary", Tenth edition, 1997, pp. 1044.

* cited by examiner

METHOD AND APPARATUS FOR CREATING TEMPLATES

RELATED APPLICATIONS

This application is a continuation-in-part of co-pending application Ser. No. 09/847,534, filed May 1, 2001, entitled "Method and Apparatus for Correlating Events", and incorporated herein by reference.

TECHNICAL FIELD

The present invention relates to computing systems and, more particularly, to a language for describing templates used to collect and correlate various events generated throughout a computing environment.

BACKGROUND

Computer systems, such as servers and desktop personal computers, are expected to operate without constant monitoring. These computer systems typically perform various tasks without the user's knowledge. When performing these tasks, the computer system often encounters events that require a particular action (such as logging the event, generating an alert for a particular system or application, or performing an action in response to the event). Various mechanisms are available to handle these events.

A computing enterprise typically includes one or more networks, services, and systems that exchange data and other information with one another. The enterprise may include one or more security mechanisms to safeguard data and authenticate users and may utilize one or more different data transmission protocols. At any particular time, one or more networks, services or systems may be down (e.g., powered down or disconnected from one or more networks). Networks, services or systems can be down for scheduled maintenance, upgrades, overload or failure. Application programs attempting to obtain event data must contend with the various networks, services, and systems in the enterprise when they are down. Additionally, application programs must contend with the security and network topology limitations of the enterprise as well as the various protocols used in the enterprise.

Operating system components, services, and applications generate a variety of different events. A particular component or application may request to be informed of a particular event (e.g., when a server crashes or when a user logs on to the system). Other components or applications may want to be notified when a particular series of events occur within a particular time period. For example, a network administrator may want to know when a server crashes within three seconds of a user logging into the system. Server crashes alone may be relatively common and user logins may also be common such that the network administrator is not particularly interested in either event by itself. However, when these two events occur within a few seconds of one another, there may be a relationship between the two events (e.g., the user login was at least partially responsible for the server crash).

Existing systems provide predefined functions that allow a network administrator or other user to create a relationship between two events. This relationship between two events is commonly referred to as a "correlation" between the two events. The predefined correlation functions provided by existing systems require the user to select from one of the predefined functions. If the correlation function desired by the user has not already been created, the user must request that the developer or supplier of the functions create a new function to meet the user's needs. If the developer or supplier is willing to create a new correlation function, this custom development work may be very expensive. Depending on the expected demand for the new correlation function, the developer or supplier may not be willing to create the requested function.

If the developer is unwilling to create a new correlation function or the cost is too high, the user can attempt to use an existing correlation function that is "closest" to the user's requirements. Such a solution may result in a significant of a desired sequence of events.

SUMMARY

The system and method described herein addresses the limitations of the prior art by providing a template description language that allows a user to develop functions that identify certain events and correlations between multiple events and/or data.

The system and method described herein supports a template description language that allows a user to create templates that are used to correlate multiple events and/or data elements. The templates created using the template description language in turn create state machines to execute a function, such as an event correlation function. The template description language supports the development of two general types of templates: correlation helper templates and correlation scenario templates. A correlation helper template is used to parameterize a particular aspect of a correlation scenario. The correlation helper template does not define a complete correlation scenario, but instead leaves one or more parameters to be defined by the user implementing the template. A correlation scenario template defines a specific correlation scenario and maintains its own correlation state. Correlation scenario templates can be used as building blocks to create larger, more complex correlation scenario templates. The templates described herein allow a user to develop templates to perform any desired event and/or data correlation functions.

In one embodiment, a template creator creates a template class that stores at least one template parameter. The template creator specifies at least one additional object to be created when an instance of the template class is created. A template user initiates the creation of a new instance of the template class. If an error occurs during the creation of the new instance of the template class, the template user receives a report identifying the error.

Another embodiment creates a first template class and designates inputs and outputs associated with the first template class. A second template class is created and inputs and outputs associated with the second template class are designated. A third template class is created by combining the first template class and the second template class.

In a particular embodiment, a template description structure includes at least one template class that stores multiple template parameters. The template description structure also includes at least one template builder class that identifies at least one additional object to be created with each instance of the template class. The template description structure further includes at least one order parameter that identifies the order in which the template builder classes are instantiated.

DETAILED DESCRIPTION

Figure 1:
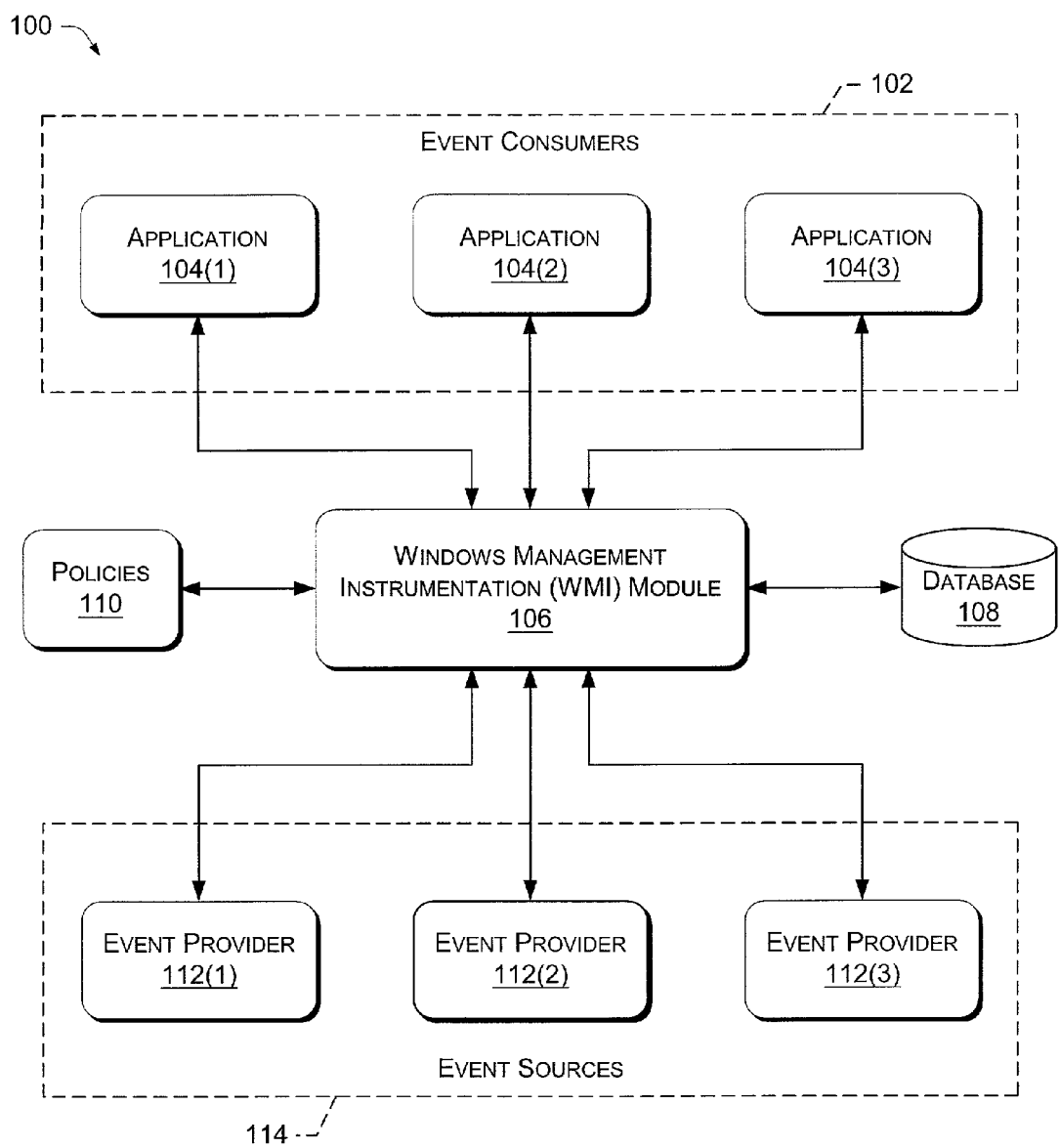
FIG. 1 illustrates a block diagram of a system that receives event information from multiple event providers and provides event information to multiple event consumers.

The system and method described herein provides a template description language that allows a user to define templates that perform various correlation functions between events and/or data. A correlation helper template is used to parameterize one or more aspects of a correlation scenario. The correlation helper template leaves one or more parameters to be defined by the user creating an instance of the template. A correlation scenario template may be used as a building block to create larger, more complex correlation scenario templates.

Web-Based Enterprise Management (WBEM) provides uniform access to as management information throughout an enterprise. WBEM is an industry initiative to develop technology for accessing management information in an enterprise environment. This management information includes, for example, information on the state of system memory, inventories of currently installed client applications, and other information related to the status of the system. A particular embodiment of the event-handling system is represented using Windows Management Instrumentation (WMI) developed by Microsoft Corporation of Redmond, Washington, which provides an infrastructure to handle various events generated by event sources throughout an enterprise.

WMI technology enables systems, applications, networks, and other managed components to be represented using the Common Information Model (CIM) designed by the Distributed Management Task Force (DMTF). This model is used to perform correlation functions discussed herein. CIM is an extensible data model for representing objects that exist in typical management environments. CIM is able to model anything in the managed environment, regardless of the location of the data source. The Managed Object Format (MOF) language is used to define and store modeled data. In addition to data modeling, WMI provides a set of base services that include query-based information retrieval and event notification. Access to these services and to the management data is provided through a single programming interface.

WMI classes define the basic units of management. Each WMI class is a template for a type of managed object. For example, Win32_DiskDrive is a model representing a physical disk drive. For each physical disk drive that exists, there is an instance of the Win32_DiskDrive class. WMI classes may contain properties, which describe the data of the class and methods, which describe the behavior of the class.

WMI classes describe managed objects that are independent of a particular implementation or technology. WMI includes an eventing subsystem that follows the publish-subscribe model, in which an event consumer subscribes for a selection of events (generated by one or more event providers) and performs an action as a result of receiving the event. WMI also provides a centralized mechanism for collecting and storing event data. This stored event data is accessible by other systems via WMI tools and/or application programming interfaces (APIs).

Although particular embodiments are discussed herein as using WMI, alternate embodiments may utilize any enterprise management system or application, whether web-based or otherwise. The event providers and event consumers discussed herein are selected for purposes of explanation. The teachings of the present invention can be used with any type of event provider and any type of event consumer. Additionally, the event-handling system and method described herein can be applied to any type of enterprise or other arrangement of computing devices, applications, and/or networks.

FIG. 1 illustrates a block diagram of a system 100 that receives event information from multiple event providers 114 (i.e., event sources) and provides event information to multiple event consumers 102 (i.e., the users of the event data). System 100 includes a WMI module 106, which receives event data from multiple event sources 114 and receives requests for information (e.g., notification of particular events) from multiple event consumers 102. The multiple event sources are identified as event providers 112. The multiple event consumers are identified as applications 104.

Event providers 112 include, for example, systems, services or applications that generate event data. An exemplary event provider is a disk drive (or an application that monitors the status of a disk drive). The disk drive may generate an event indicating the available storage capacity on the disk drive or indicating the amount of data currently stored on the disk drive. The disk drive may also generate an event indicating that the disk drive is nearly full of data (e.g., when ninety-five percent or more of the disk drive's capacity is used).

Event consumers 102 may request to be notified of certain events (also referred to as "subscribing" to an event). An example event consumer is an application may request to receive events generated by any of the disk drives or other storage devices in the enterprise. The application can use this event information to distribute storage tasks among the multiple storage devices based on the available capacity of each device and/or the quantity of read or write requests received by each storage device.

System 100 also includes a set of policies 110, which are accessible by WMI module 106. Policies 110 may control the configuration of one or more systems in the enterprise. Other policies may define various activities, such as event filtering, event correlation, and the forwarding of events to particular devices or applications. A database 108 is coupled to WMI module 106. Database 108 stores various information related to the enterprise. For example, database 108 can store event data (i.e., creating an event log), policy data, and enterprise configuration information.

The WMI module 106 uses WMI features to provide a distributed architecture that is capable of selecting, filtering, correlating, forwarding, storing, and delivering event data in an enterprise. The WMI module also allows event consumers to request data related to a particular event, request data from a particular node or device in the enterprise, define the manner in which events are correlated with one another, define how certain events should be forwarded, and define how to store event data.

The WMI module 106 provides a policy-based administration of the enterprise. The policy infrastructure allows administrators to set a policy in the Directory Service (DS) and the WMI module ensures that the proper set of WMI objects (e.g., filters, bindings, correlators, consumers, and configuration objects) are delivered to the proper devices or applications in the enterprise.

As shown in FIG. 1, policies 110 and database 108 are separate from WMI module 106. However, in alternate embodiments, policies 110 and/or database 108 may be integrated into WMI module 106.

Table 1 below identifies various types of event providers available in a particular embodiment. Additionally, the table includes a description of the events generated by each event provider. For example, the Win32 Provider generates events that include information related to the operating system, computer system, peripheral devices, file systems, and security for a particular device (such as a computer system) in the enterprise.

TABLE 1

| Event Provider | Description of Events Provided |
| --- | --- |
| Win32 Provider | Supplies information about the operating system, computer system, peripheral devices, file systems, and security. |
| WDM Provider | Supplies low-level Windows Driver Model (WDM) information for user input devices, storage devices, network interfaces, and communications ports. |
| Performance Counter Provider | Exposes the raw performance counter information used to compute various performance values. |
| Windows Installer Provider | Supplies information about applications installed with the Windows Installer. |

Figure 2:
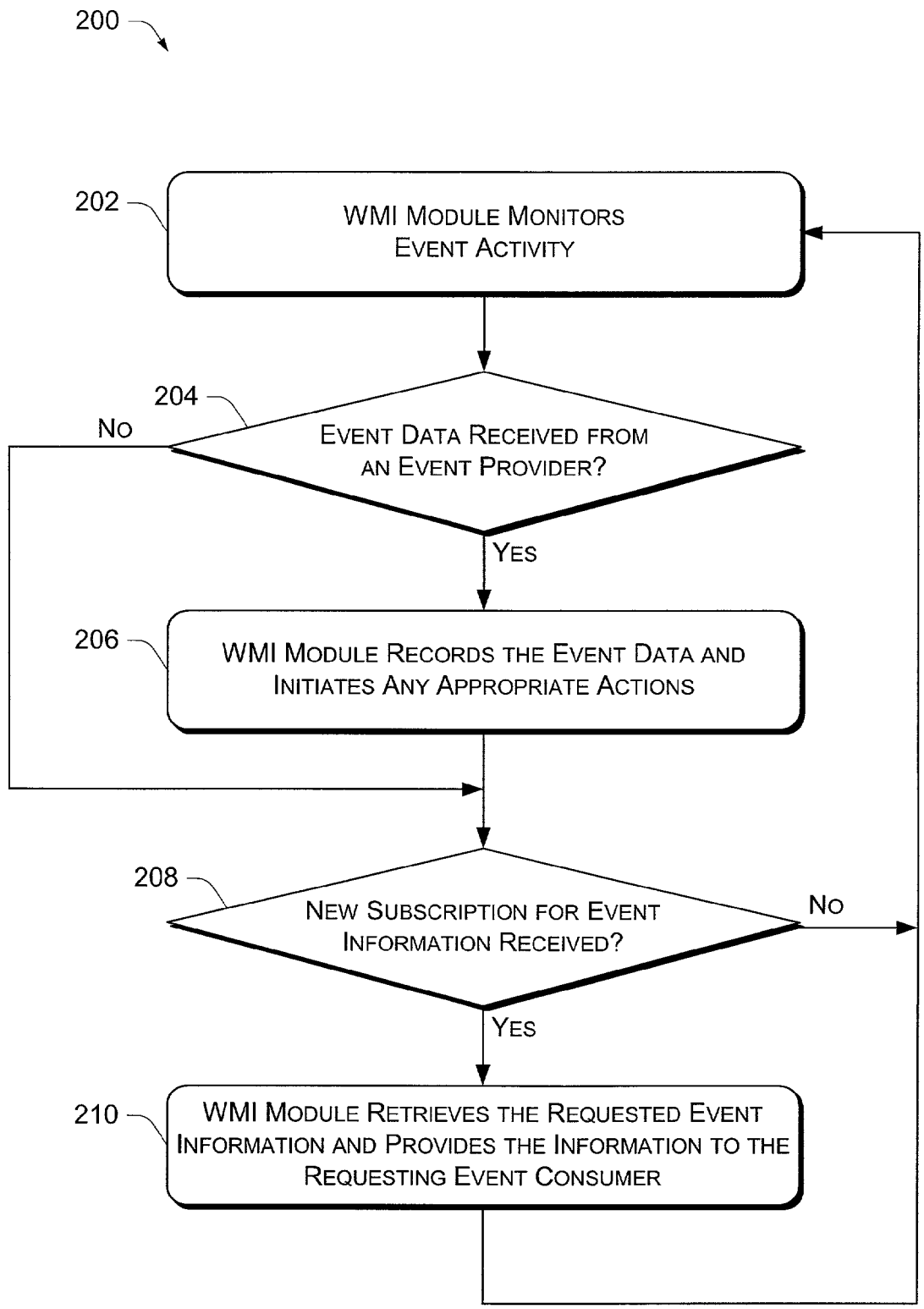
FIG. 2 is a flow diagram illustrating an event-handling procedure.

FIG. 2 is a flow diagram illustrating an event-handling procedure 200. The WMI module monitors event activity throughout the enterprise (block 202). The procedure 200 determines whether event data has been received from an event provider (block 204). If event data has been received, the WMI module records the event data and initiates any appropriate actions (block 206). An example action includes notifying an event consumer of the event (e.g., if the event consumer previously subscribed to such an event).

At block 208, the procedure 200 determines whether a new subscription for event information has been received. The procedure 200 may also determine whether a request to revise an existing subscription has been received. If a new subscription (or a revised subscription) is received, the procedure continues to block 210 where the WMI module retrieves the requested event information and provides the information to the requesting event customer. Alternatively, the procedure may log the subscription request and notify the requesting event consumer when the next event is received that qualifies under the consumer's subscription request.

Figure 3:
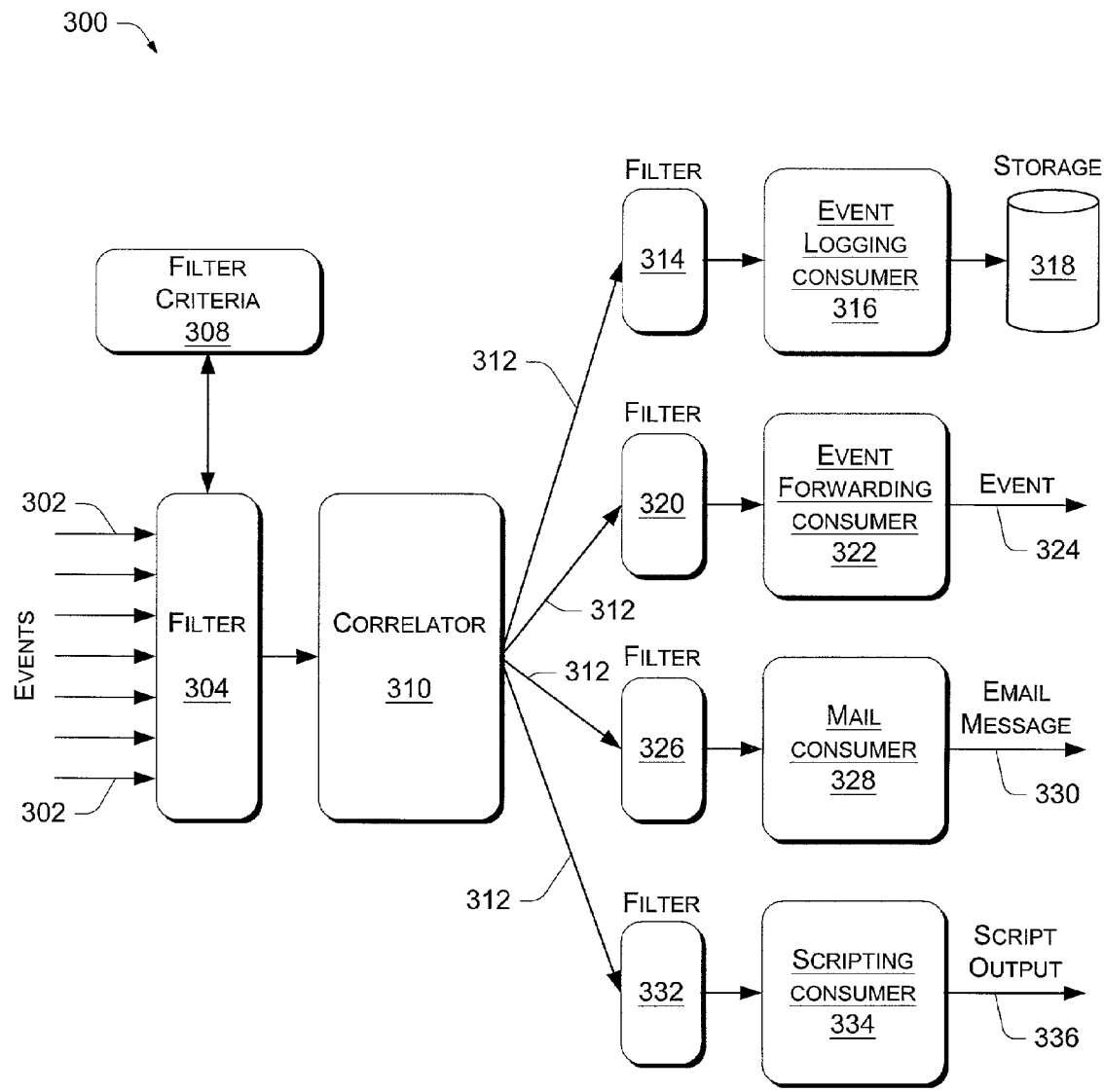
FIG. 3 illustrates a block diagram of a system that receives multiple events from various event sources, filters the events, and distributes the filtered events to multiple event consumers.

FIG. 3 illustrates a block diagram of a system 300 that receives multiple events from various event sources, filters the events, and distributes the filtered events to multiple event consumers. Multiple events 302 are received by an event filter 304 that determines which of the received events are passed through the filter to a correlator 310. The filter 304 applies various filter criteria 308 to the received events in determining which events pass through the filter to correlator 310. Additional details regarding correlator 310 and the correlation functions are discussed below.

The correlator 310 correlates various events and creates additional events 312 that are provided to multiple filters 314, 320, 326, and 332. Each filter 314, 320, 326, and 332 includes various filter criteria that determines what event characteristics are required to allow the event to pass through the filter. Although each event 312 is sent to all four filters, the event may be rejected (i.e., not pass through the filter) by any or all of the filters. Similarly, a particular event may pass through two or more different filters, depending on the filter criteria associated with each filter.

Each filter 314, 320, 326, and 332 is associated with a consumer (i.e., an event consumer) 316, 322, 328, and 334, respectively. For example, events that pass through filter 314 are provided to event logging consumer 316, which logs the event data to a storage device 318. The logged data can be retrieved at a later time for analysis or other purposes. Events that meet the criteria of filter 320 are provided to event forwarding consumer 322, which generates a forwarded event 324 that is distributed to one or more destinations. Events that satisfy the criteria of filter 326 are provided to mail consumer 328, which generates and sends an email message 330 in response to receipt of each event. The email message 330 to may contain information about one or more events (such as the event type or the source of the event). Events that pass through filter 332 are provided to scripting consumer 334, which executes a script that may perform a function and/or generate a script output 336.

Although the example of FIG. 3 illustrates four filters 314, 320, 326, and 332 (and associated consumers 316, 322, 328, and 334, respectively) that receive events 312, alternate embodiments may include any number of filters and associated consumers. Further, the actions performed by consumers 316, 322, 328, and 334 are provided as examples. Alternate consumers may perform any type of action in response to receiving an event.

Figure 4:
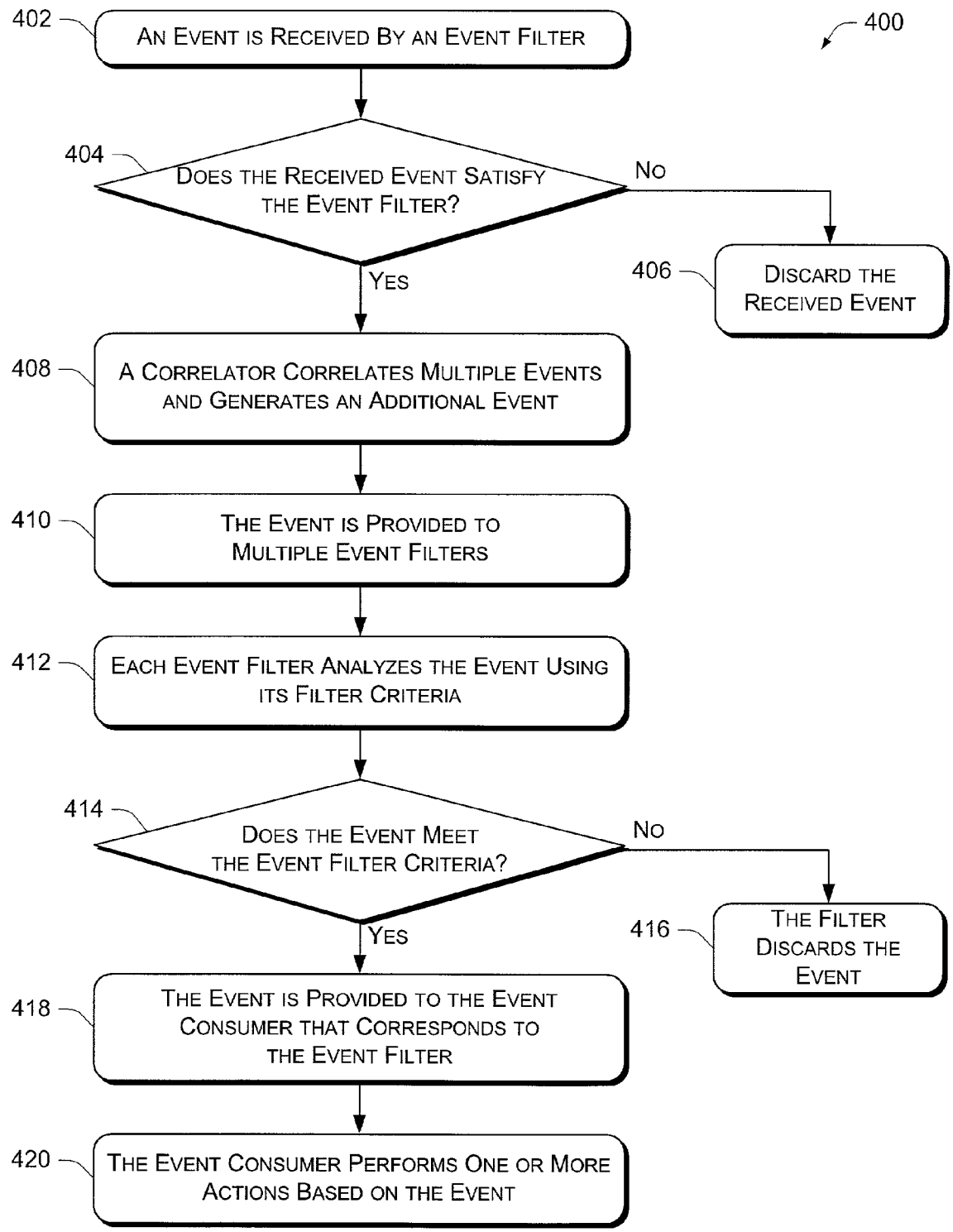
FIG. 4 is a flow diagram illustrating a procedure for handling events in the system of FIG. 3.

FIG. 4 is a flow diagram illustrating a procedure 400 for handling events in the system of FIG. 3. An event is received by an event filter (block 402), such as filter 304 in FIG. 3. The procedure 400 determines whether the received event satisfies the event filter (block 404). Satisfying the event filter includes satisfying the filter criteria (e.g., filter criteria 308). If the received event does not satisfy the event filter, then the received event is discarded (block 406). Discarding an event may include ignoring the event or deleting the event and any reference to the event from storage registers or other storage mechanisms. If the received event satisfies the event filter (i.e., passes through the filter), a correlator correlates multiple received events (block 408) and may generate one or more new events that are provided to multiple event filters (e.g., filters 314, 320, 326, and 332 in FIG. 3) in block 410.

Each event filter analyzes the event using its own filter criteria (block 412). Next, each event filter determines whether the event meets the event filter's criteria (block 414). This determination is performed by each event filter based on the filter criteria for that particular event filter. If the event does not meet the criteria for a particular event filter, that event filter discards the event (block 416). However, if the event satisfies the criteria for a particular event filter, that event filter passes the event to the event consumer that corresponds to the particular event filter (block 418). The event consumer then performs one or more actions based on the event (block 420). For example, the actions may include generating an email message or forwarding the event to another system. The procedure of FIG. 4 is repeated for each received event.

Figure 5:
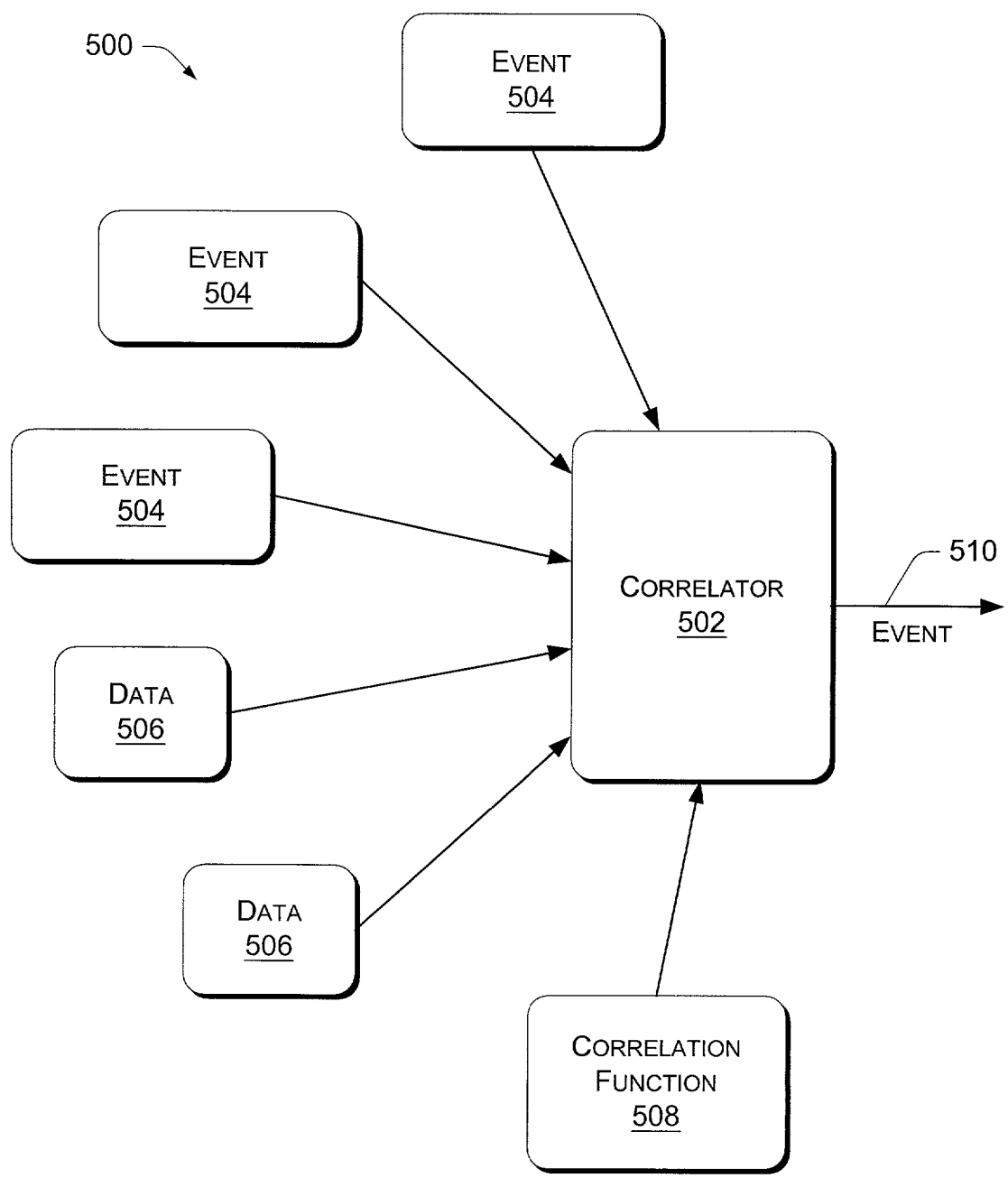
FIG. 5 illustrates a block diagram of an exemplary system in which a correlator receives events, data, and correlation functions from multiple sources.

FIG. 5 illustrates a block diagram of an exemplary system 500 in which a correlator 502 receives events 504, data elements 506, and correlation functions 508 from multiple sources. Events 504 have passed through a filter (e.g., filter 304 in FIG. 3) prior to being received by correlator 502. The terms "data" and "data elements" are used interchangeably herein. Correlator 502 may be similar to the correlator 310 (FIG. 3) discussed above. Correlator 502 may receive events 504 directly from an event source or may receive events through an event filter, such as filter 304 discussed above. In one embodiment, correlator 502 receives specific event information based on event subscriptions applied to various event sources in the enterprise. Correlator 502 may receive data elements 506 directly from a data source or may receive the data through an intermediate device, such as a database or other data storage or data collection device. Correlator 502 also receives correlation functions from one or more sources, such as from an administrator's node. The correlation function 508 is a group of updating consumers (discussed below) that receive events like other consumers. These updating consumers cause one or more events 510 to occur (either directly or indirectly).

Correlator 502 applies the received correlation functions to the events and data received from various sources throughout the enterprise. When the conditions of a particular correlation function are satisfied, correlator 502 generates an event 510, which is distributed to various event consumers in the enterprise. In one embodiment, the event 510 is provided to event consumers that subscribed to receive that particular event.

Figure 6:
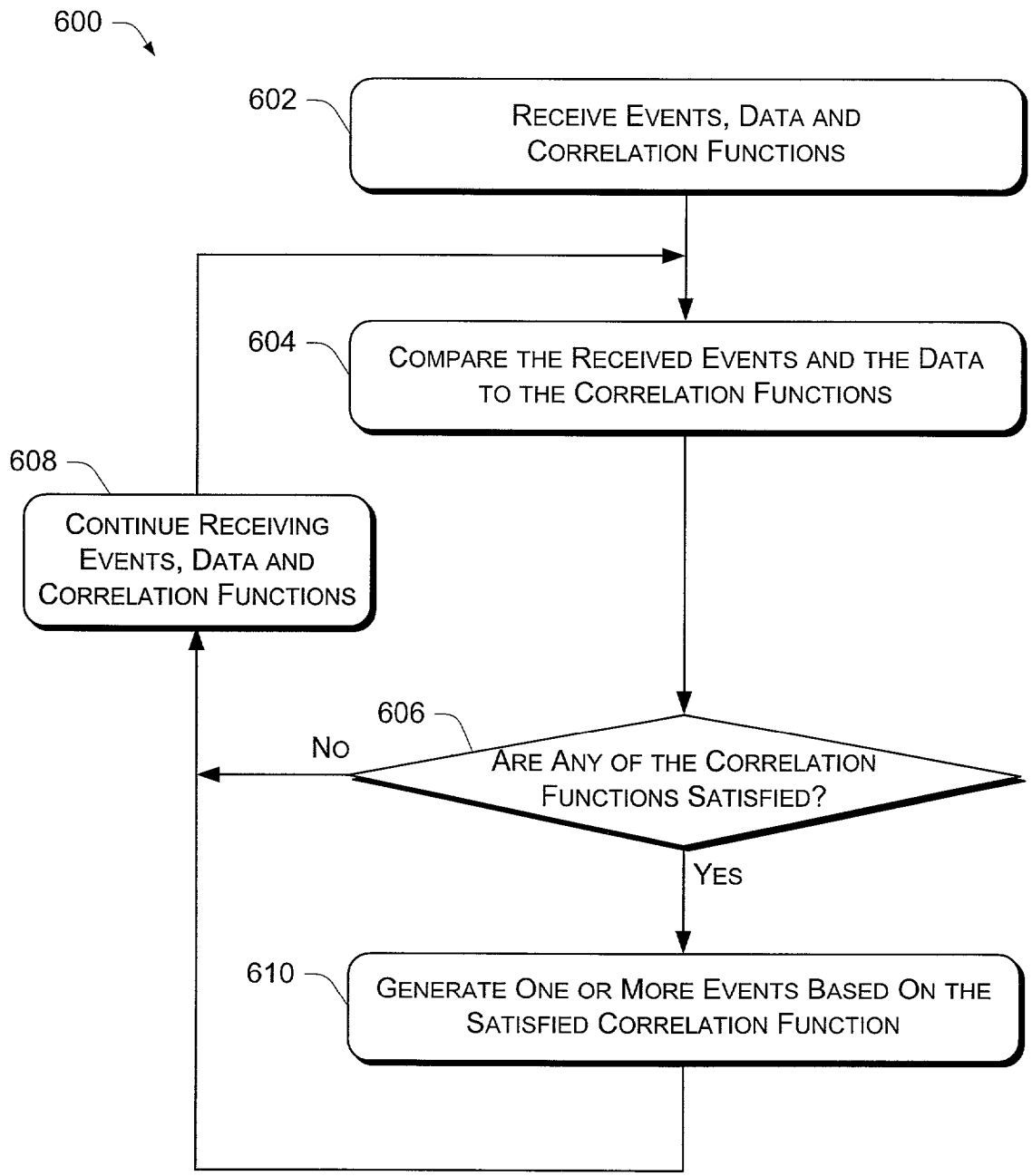
FIG. 6 is a flow diagram illustrating a procedure for correlating events and/or data in an enterprise.
Figure 7:
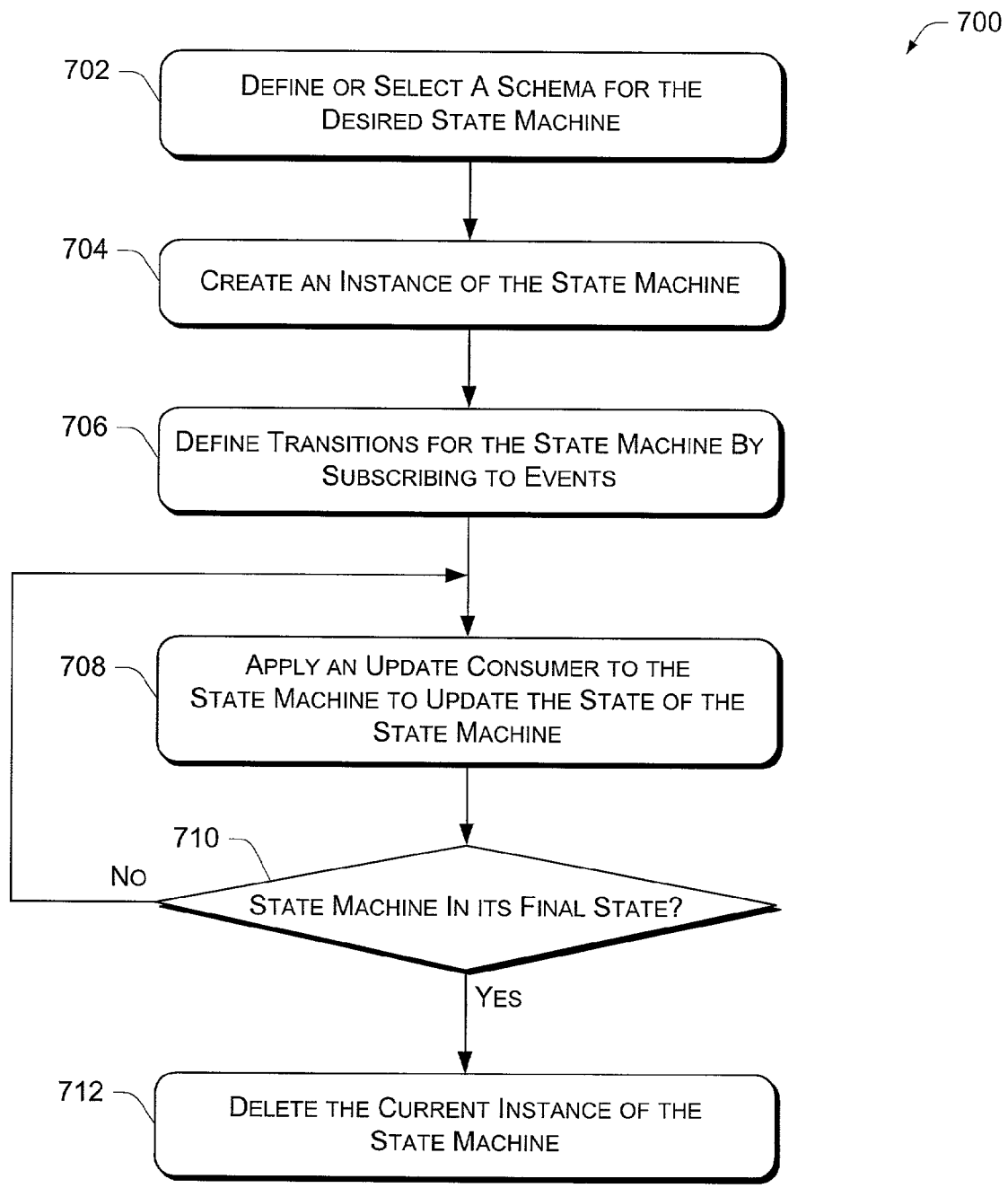
FIG. 7 is a flow diagram illustrating a procedure for implementing a state machine that applies a correlation function.

FIG. 6 is a flow diagram illustrating a procedure 600 for correlating events and/or data in an enterprise. A correlator (e.g., correlator 502 in FIG. 5) receives events, data and correlation functions from multiple sources in an enterprise (block 602). The received events and data are compared to the correlation functions (block 604). The procedure 600 next determines whether any of the correlation functions are satisfied by the received events and data (block 606). If not, the procedure 600 continues receiving events, data and correlation functions (block 608), and returns to block 604 to continue comparing received events and data to the correlation functions. If any of the correlation functions are satisfied by the received events and data, the correlator generates one or more events based on the satisfied correlation function (block 610). After generating one or more events in block 610, the procedure 600 continues to block 608 to continue receiving events, data and correlations functions FIG. 7 is a flow diagram illustrating a procedure 700 for implementing a user defines or selects a pre-defined schema for the desired state machine (block 702). Next, an instance of the desired state machine is created (block 704). (block 706). An update consumer is applied to the state machine to update the state of the state machine (block 708). The updating consumer is applied to the state machine each time an event to which the updating consumer has subscribed occurs Procedure 700 then determines whether the state machine is in its final state (block 710). If the state machine is not in its final state, the procedure 700 returns to block 708 to again apply the update consumer to the state machine. If the state machine is in its final state, the procedure 700 continues to block 712, which deletes the current instance of the state machine. If another correlation functions to be implemented, a new instance of the desired state machine is created and executed.

Examples of events include a server crash, a user logging into the system, or a particular device becoming unavailable. Example data elements include the available disk space, the current memory utilization, and the number of users logged into particular servers. An example correlation function that correlates two events generates an email message when two different server crashes occur within five second of one another. An example correlation function that correlates an event with data generates an event when a server crashes and the available storage space on the server's hard drive is less than five megabytes. Another example correlation function pages an administration when the available storage space on a server's hard disk stays below ten megabytes for at least five minutes. Any other selection of events and/or data can be combined to create a correlation function based on the desires of an administrator or other user.

As mentioned above, a state machine implements a desired correlation function that correlates events and/or data. A set of commonly used state machines are provided for use by administrators (or other users) in defining correlation functions. These commonly used state machines require the administrator to fill in certain parameters, but the administrator is not required to understand the programming language used to create the state machine. If the set of commonly used state machines does not include a state machine that performs the desired correlation function, a new state machine can be created using the appropriate programming language. The programming language can be any database language or other non-procedural language. In a particular embodiment, the programming language is SQL.

Each state machine is a class object. One or more instances of a state machine can be implemented simultaneously to monitor different events and data. In a particular enterprise, any number of instances of state machines may be operating simultaneously. In one embodiment of the invention, SQL is used to query various states in any state machine.

In a particular example, the schema for a state machine that detects a specific number of process crashes within a specified time period can be defined as follows.

```
Class StateA
{
    string ProcessName;
    int NumCrashes;
    int RemainingTime;
}
```

In the above example, the state machine is a class having three properties. ProcessName is a string that represents the name of the process being monitored for crashes. NumCrashes is an integer that identifies the number of crashes that will trigger an event if those crashes occur within a particular time period, which is defined by the property RemainingTime, which is an integer value. The RemainingTime property is reset each time a new instance of StateA is created. If RemainingTime reaches zero without being reset, an event is triggered indicating that the state machine time expired before detecting the specified number of crashes. When RemainingTime reaches zero, that particular instance of StateA is deleted because the specified parameters were not satisfied within the particular time period.

An administrator wanting to use the correlation function defined by StateA first creates an instance of StateA. The administrator then provides a value for NumCrashes and RemainingTime. Thus, the administrator need not understand the complete syntax of the state machine and need not understand the programming language used to define and create the state machine.

After defining the schema for the StateA state machine, the transitions for the state machine (i.e., the transitions from one state to another) are defined by subscribing to various events. Specifically, the transition is defined by the updating consumer and the event that causes the transition is defined by the event subscription. These event subscriptions function as the transitions for the state machine. When an appropriate event occurs, the state machine transitions to the next state. The state machine transitions are defined by identifying the event that will cause the transition and identifying the action to perform based on the occurrence of the event. The action may include, for example, generating an email message, logging event data to a file, or forwarding an event to one or more destinations. The transitions are defined using updating consumer instances.

After defining the transitions for the state machine, an updating consumer is used to update the state of the state machine. The updating consumer (named "update") is a class object. One or more instances of the updating consumer can be implemented simultaneously to handle the updating of different state machines. An example updating consumer implementation is illustrated below.

Update StateA where
        ProcessName=ThisEvent.ProcessName set
        NumCrashes=NumCrashes+1

In this example, the updating consumer updates an instance of state machine StateA, defined above. The ProcessName property is defined as "ThisEvent.ProcessName", which inserts the name of the process that crashed (which is identified in the received crash event) as "ThisEvent". The property NumCrashes is incremented by one each time a crash event is received.

While a particular state machine is operating, the various internal states of the state machine can be obtained (e.g., queried). This allows an administrator or other user to observe the correlation as the various events occur in a system. Even if the conditions have not yet been met to generate the appropriate event, the administrator can observe the current state or value of different properties (e.g., how many crashes have occurred or how much time is left before the state machine is reset). The ability to observe the various states and properties of the state machine assists with troubleshooting and determining whether the desired correlation function has been properly established.

Various examples have been discussed herein in which two different events are correlated with one another or an event is correlated with data. However, in alternate embodiments, any number of events can be combined together to form a correlation function. Similarly, any number of events can be combined with one or more data elements to create a correlation function.

The following example illustrates classes and class instances, a correlation scenario, updating consumers, filters and bindings as used with the present invention. Example class and instances of the class:

```
class ExampleClass
{
    [key] string Name;
    boolean Prop;
};
instance of ExampleClass
{
    Name = "A";
    Prop = TRUE;
};
instance of ExampleClass
{
    Name = "B";
    Prop = FALSE;
};
```

The correlation scenario is defined:

```
[ dynamic, provider("Microsoft WMI Transient Provider")]
class ExampleCorrelationState : MSFT_CorrelationStateBase
{
    boolean ReceivedEventA;
    boolean ReceivedEventB;
    [trns_egg_timer] uint32 Timer;
};
Class BothAandBEvent : MSFT_UCEventBase
{
    string Name;
};
instance of MSFT_UpdatingConsumer as $UI
{
    Id = "Initializer";
    Scenario = "ExampleCorrelationScenario";
    Commands = { "INSERT INTO ExampleCorrelationState "
        "(Id, Scenario, ReceivedEventA, ReceivedEventB, Timer)"
        "('ExampleCorrelationState', 'ExampleCorrelationScenario',"
            "FALSE, FALSE, 0 )"};
};
instance of MSFT_UpdatingConsumer as $UA
{
    Id = "SetEventA";
    Scenario = "ExampleCorrelationScenario";
    Commands = { "UPDATE ExampleCorrelationState"
        "SET ReceivedEventA = TRUE, Timer = 5"
        "WHERE Scenario = 'ExampleCorrelationScenario'"} ;
};
instance of MSFT_UpdatingConsumer as $UB
{
    Id = "SetEventB";
    Scenario = "ExampleCorrelationScenario";
    Commands = {"UPDATE ExampleCorrelationState"
        "SET ReceivedEventB = TRUE, Timer = 5"
        "WHERE Scenario = 'ExampleCorrelationScenario'" };
};
```

The $UA and $UB updating consumers cause the timer to be reset to five seconds whenever either Event A or Event B occurs. The next updating consumer causes the ReceivedEvent A and the ReceivedEvent B to be reset when the timer expires.

```
instance of MSFT_UpdatingConsumer as $UTE
{
    Id = "ResetTimer";
    Scenario = "ExampleCorrelationScenario";
    Commands = {"UPDATE ExampleCorrelationState"
        "SET ReceivedEventA = FALSE, ReceivedEventB = FALSE"
        "WHERE Scenario = 'ExampleCorrelationScenario'" } ;
} ;
```

The following defines filters and bindings to fully define the scenario:

```
instance of _EventFilter as $FSC
{
    Name = "ScenarioCreation";
    Query = "SELECT * FROM _InstanceCreationEvent"
        "WHERE TargetInstance ISA 'MSFT_UCScenario'"
        "AND TargetInstance.Id = 'ExampleCorrelationScenario'";
    QueryLanguage = "WQL";
} ;
instance of _EventFilter as $FSM
{
    Name = "ScenarioModification";
    Query = "SELECT * FROM _InstanceModificationEvent"
        "WHERE TargetInstance ISA 'MSFT_UCScenario'"
        "AND TargetInstance.Id = 'ExampleCorrelationScenario'";
    QueryLanguage = "WQL";
} ;
instance of_EventFilter as $FBOOT
{
    Name = "OnBoot";
    Query = "SELECT * FROM MSFT_TransientRebootEvent";
    QueryLanguage = "WQL";
} ;
instance of_EventFilter as $FA
{
    Name = "EventAFilter";
    Query = "SELECT * FROM _InstanceModificationEvent"
        "WHERE TargetInstance ISA 'ExampleClass'"
        "AND TargetInstance.Name = 'A'";
    QueryLanguage = "WQL";
} ;
instance of_EventFilter as $FB
{
    Name = "EventBFilter";
    Query = "SELECT * FROM _InstanceModificationEvent"
        "WHERE TargetInstance ISA 'ExampleClass'"
        "AND TargetInstance.Name = 'B'";
    QueryLanguage = "WQL";
} ;
instance of_EventFilter as $FTE
{
    Name = "TimerExpiredEvent";
    Query = "SELECT * FROM MSFT_TransientEggTimerEvent"
        "WHERE Object ISA 'ExampleCorrelationState'"
        "AND Object.Scenario = 'ExampleCorrelationScenario'";
    QueryLanguage = "WQL";
} ;
```

Defining the bindings:

```
instance of _FilterToConsumerBinding
{
    Filter = $FSC;
    Consumer = $UI;
} ;
instance of _FilterToConsumerBinding
{
    Filter = $FSM;
    Consumer = $UI;
} ;
instance of _FilterToConsumerBinding
{
    Filter = $FBOOT;
    Consumer = $UI;
} ;
instance of _FilterToConsumerBinding
{
    Filter = $FA;
    Consumer = $UA;
} ;
instance of _FilterToConsumerBinding
{
    Filter = $FB;
    Consumer = $UB;
} ;
instance of _FilterToConsumerBinding
{
    Filter = $FTE;
    Consumer = $UTE;
} ;
```

When creating this updating consumer scenario, the activation can be triggered to occur using the MSFT_UCScenario instance. Since, in this example, the system would have $CI consumer tied to the creation of the Scenario instance, the following instantiation would cause the initialization to occur:

```
instance of MSFT _UCScenario
{
    Id = "ExampleCorrelationScenario";
    Name = "ExampleCorrelationScenario";
} ;
```

This instance helps the updating consumer provider determine how state instances relate to the scenario:

```
instance of MSFT_UCScenarioAssociationInfo
{
    Id = "StateAssociation";
    Scenario = "ExampleCorrelationScenario";
    Query = "SELECT * FROM ExampleCorrelationState"
        "WHERE Scenario = 'ExampleCorrelationScenario'";
} ;
```

Finally, an example filter to determine when both events occurred within the windows:

```
instance of _EventFilter as $FBOTH
{
    Name = "BothEventsOccurred";
    Query = "SELECT * FROM _InstanceModificationEvent"
        "WHERE TargetInstance ISA 'ExampleCorrelationState'"
        "AND TargetInstance.ReceivedEventA = TRUE"
        "AND TargetInstance.ReceivedEventB = TRUE"
        "AND TargetInstance.Scenario = 'ExampleCorrelation-
            Scenario'";
    QueryLanguage = "WQL";
} ;
```

To create a custom event that is triggered when this condition is met, then the user can subscribe an updating consumer to it:

```
instance of MSFT_UpdatingConsumer as $UBOTH
{
    Id = "BothEventsOccurred";
    Scenario = "ExampleCorrelationScenario";
    Commands = { "INSERT INTO BothAandBEvent (Name)"
        "('ExampleCorrelationScenario')"} ;
};
instance of _FilterToConsumerBinding
{
    Filter = $FBOTH;
    Consumer = $UBOTH;
};
```

Templates

The systems discussed above provide various state machines and other tools to correlate events and/or data. The use of templates, discussed below, provide another tool that allows a user to create a parameterized scenario for the benefit of many other users. Once a template is created, many users can utilize the template by simply specifying the appropriate parameter values. As used herein, a "template creator" is an individual that creates one or more templates that are used by one or more "template users". The templates created using the template description language described herein can be used to create a state machine for a correlation scenario.

Template Provider

A "template provider" is at the core of the implementation of templates. In a particular embodiment, the template provider is a WMI Instance Provider. The template provider was developed to help administrators handle complex updating of consumer scenarios.

Each time a template user creates an instance of a template class (discussed below), the template provider creates a group of other instances, referred to as "target objects", which are specified by the template creator at the time the template is created. The values in the target objects are parameterized by the values of the instance of the template class (these values are provided by the template user). This process is referred to as instantiation. When an instance of a template is deleted, the template provider automatically deletes all of the target objects that were created when the template instance was created.

Figure 8:
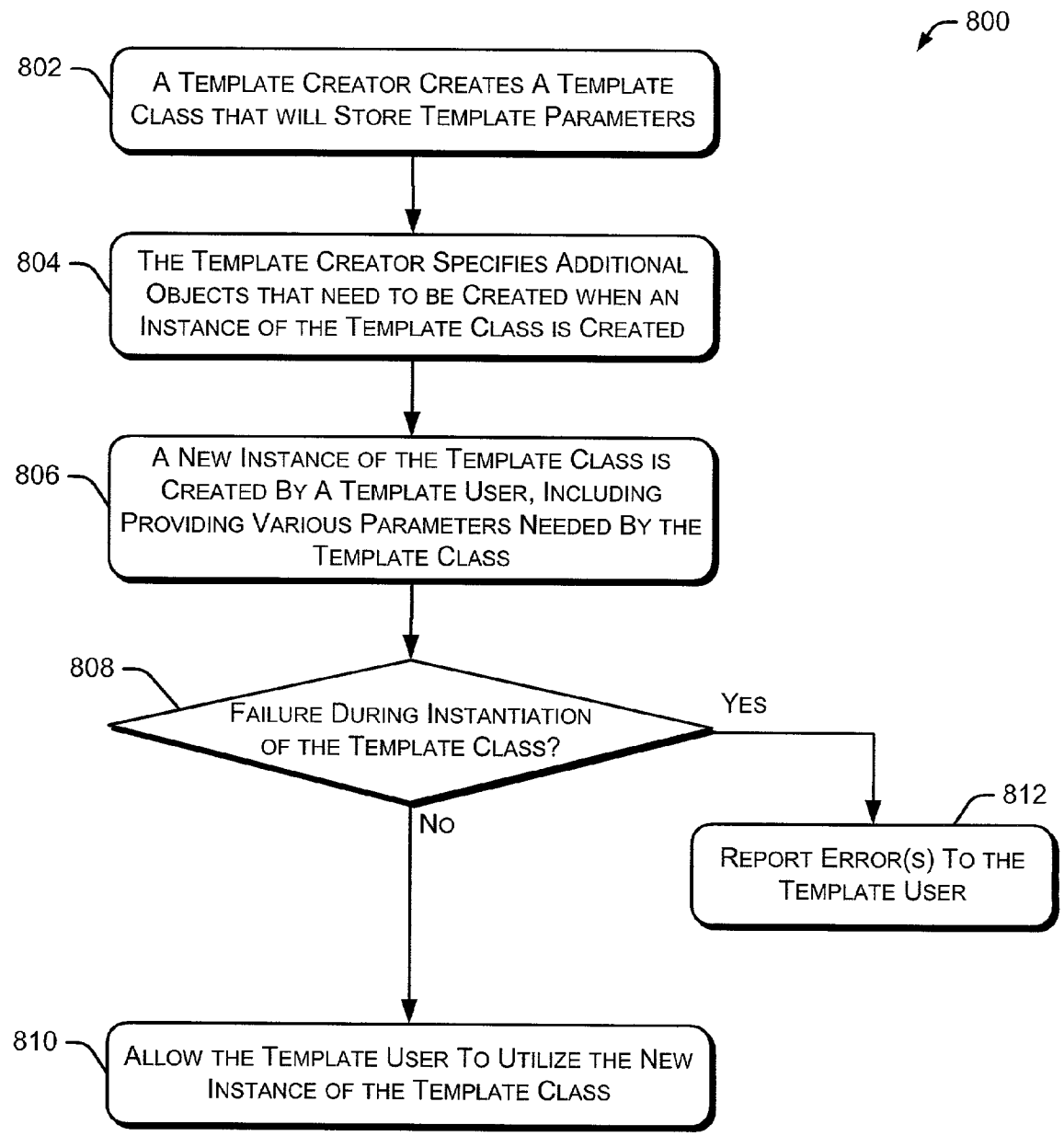
FIG. 8 is a flow diagram illustrating a procedure for defining a template class and creating a new instance of the template class.

FIG. 8 is a flow diagram illustrating a procedure 800 for defining a template class and creating a new instance of the template class. Initially, a template creator creates a template class that will store template parameters (block 802). The template creator then specifies additional objects that need to be created when an instance of the template class is created (block 804). After the template class has been defined (i.e., the two steps above), a new instance of the template class can be created by a template user (block 806). The template user creates the new instance of the template class by providing one or more parameters needed by the template class.

If a failure occurs during the instantiation of the template class, the error is reported to the template user (block 812). If the template instance is created without error, the template user is then able to utilize the new instance of the template class (block 810). Additionally, other users may utilize the new instance of the template class or may create another instance of the same template class using the procedures discussed above.

Template Class

As mentioned above with respect to FIG. 8, the first step in creating a template is the creation of a class that will store template parameters. This class is referred to as a "template class" and its properties are referred to as template arguments. An instance of the template class will be referred to as a template instance. The template class is created by the designer of the template, and is designated as provided by the template provider (described below). For instance, the following is a valid template class:

```
[dynamic, provider("Microsoft WMI TemplateProvider")]
Class CorrelationTemplate: MSFT_TemplateBase
{
    [key] string Scenario;
    string WatchClass;
    string WatchScopeExpr;
    string WatchProp;
    sint32 SomeValue;
};
```

In the above example, the class is derived from MSFT_TemplateBase. The use of MSFT_TemplateBase is optional. The schema of MSFT_TemplateBase is:

```
[abstract]
class MSFT_TemplateBase
{
    [NotNull] boolean Active = TRUE;
};
```

The "Active" property allows a template instance to exist, but not the objects that the template instantiates. This is useful for storing template instances that will be activated at a later time.

Template Instantiation

Template instantiation can occur when a template instance is created or modified. Template instantiation will take place if the template class does not inherit from MSFT_TemplateBase or the template class does inherit from MSFT_TemplateBase and the active property is "True". When a template instance is modified, (e.g., one or more of its template arguments have changed), then only target objects that change will be re-instantiated. If the template instance is deleted, then all target objects that it owns will be deleted as well.

Template Builders

The next step in creating a template is specifying what lower-level objects need to be created when a user creates an instance of the template. This is done by creating instances of the "TemplateBuilder" class, one for each instance that the template creator wants created whenever a template user creates an instance of the template class. The following is an example of the TemplateBuilder class.

```
Class MSFT_TemplateBuilder
{
    [key] string Name;
    [key] string Template;
    object Target;
    string ControllingProperty;
    string NamespaceProperty;
    uint32 Order;
```

```
                    -continued
    };
```

In the above example, "Name" is a unique name for this object within the context of this template. "Template" is the name of the template class for which this template builder is specified. "Target" is an embedded object that will be instantiated (PutInstance( ) will be called with it as an argument). ControllingProperty (optional) makes instantiation of the builder be dependent on a template argument. If the ControllingProperty property is specified, then on instantiation, the template provider will observe the template argument named by the property. If the value of this property is NULL or if the property is a boolean type and its value is "false", then the builder will not be instantiated. NamespaceProperty (optional) is the name of a property on the template object. At instantiation time, the value of the NamespaceProperty specifies the namespace in which the target will be instantiated. "Order" (optional) identifies the order in which the template provider instantiates Template-Builders. The Order value is an integer that specifies that all builder objects having an Order X will be instantiated before builder objects having an Order Y where X<Y. If no order is specified then it is defaulted to 0.

If the instance to be created by the builder is not parameterized by any template arguments, TemplateObject is simply the instance to be created, without any special qualifiers. An example TemplateObject is:

```
Instance of MSFT_TemplateBuilder
{
        Name = "ExampleBuilder";
        Template = "CorrelationTemplate";
        TemplateObject = instance of EventFilter
    {
        Query = "select * from InstanceModificationEvent WHERE
TargetInstance ISA 'MyClass'"}
    };
};
```

In most cases, the values in the object to be created are parameterized by the values in the template. For instance, in the above example, the template creator would likely want to register a filter for events of the type specified in the WatchClass property of the template. Three instance-level property qualifiers are available to allow parameterization of objects. These three instance-level property qualifiers are identified below.

[tmpl_prop_val(PropName)] specifies that this property should receive the value of the property PropName of the template class, as in [tmpl_prop_val(SomeValue)]

[tmpl_subst_str(SubstitutionString)] specifies that this property should receive the value of the Substitution-String with all the substitutions performed. SubstitutionString uses environment-variable-like syntax:

[tmpl_subst_str("select * from %WatchClass%")] SomeProperty;

Here, SomeProperty will receive "select * from MyClass" if the WatchClass property of the template class had a value of 'MyClass'. If the property specified by WatchClass is null, then no substitution takes place. In this case, SomeProperty would be 'select * from'.

To support more complex string substitutions, extension functions can be placed in the substitution string. More complex substitutions arise when dealing with substitutions involving SQL queries. Two extension functions supported by the template provider are:

%!ConditionalSubstitution("String", TemplatePropIdentifier)% and

%!PrefixedWhereSubstitution(Identifier, QueryTemplatePropIdentifier)%

The ConditionalSubstitution extension function allows "String" to be substituted if the template instance property specified by Identifier is not null. This is useful for templates that form SQL queries which may or may not have a where clause. The conditional substitution in this example would be the 'WHERE' keyword. Using the original example, this might look like. . .

[tmpl_subst_str("select * from %WatchClass%"
    "%!ConditionalSubstitution("WHERE", WatchScopeExpr)%"
    "%WatchScopeExpr%")] SomeProperty;

The reason why it is not sufficient to require the WatchScopeExpr parameter to just contain the WHERE keyword, is that often, the where clause is also used in queries which already have a where clause. For these cases, it would be necessary to prepend an AND to the where clause. Using the ConditionalSubstitution extension function solves these types of problems.

The PrefixedWhereSubstitution extension function allows the property references of a VALID 'where' clause of a SQL query to be prefixed with the value of 'Identifier.' The TemplateQueryPropIdentifier refers to a template parameter having a valid 'where' clause as its value. A valid where clause is the substring of a valid SQL statement after the where keyword. An example of the 'PrefixedWhere' substitution would convert the clause "A=1 and B=2 or C=3" to "MyIdentifier.A=1 and MyIdentifier.B=2 or MyIdentifier.C=3". If 'WatchScopeExpr' in the preceding example template class had a value of "A=1 and B=2 or C=3", then:

[tmpl_subst_str("select * from InstanceModificationEvent"
    "WHERE TargetInstance ISA '%WatchClass%'"
    "%!ConditionalSubstitution("AND", WatchScopeExp
    "%!PrefixedWhereSubstitution(TargetInstance, WatchScopeExpr)%"]
SomeProperty;

would set the value of SomeProperty to . . .

select * from InstanceModificationEvent WHERE TargetInstance ISA 'MyClass' AND TargetInstance.A=1and TargetInstance.B=2 or TargetInstance.C=3

When using both qualifiers, key properties of the target objects created by other builders of the template can be referenced using the BUILDER.<BuilderName>.<KeyName> syntax. RELPATH is a valid keyname. This allows one to use key properties of instantiated targets that are 'keyholed' when creating other target objects.

It should be noted that there is nothing preventing the TemplateObject embedded object property of the Template-Builder from being yet another Template. This allows templates to be nested within other templates.

Template Associations

A Template instance can be associated with the instances that the Template Builder objects create on instantiation and vice-versa. This association is defined as follows:

```
MSFT_TemplateAssociation
{
    [key] MSFT_TemplateBase ref Template;
    [key] object ref Target;
};
```

The template provider impersonates the client of its methods. This ensures that actions that are performed by the template provider, such as instance creation, will be done using the identity of the caller.

The template provider returns complex error information when creating template instances. This information is provided in the form of a COM Error object. The error object implements IWbemClassObject and its definition looks like:

```
class TemplateErrorStatus : ExtendedStatus
{
    string Property;
    string ErrorStr;
    object TemplateBuilder;
    object TemplateObject;
    object ExtendedStatus;
};
```

The Property attribute names the property of the TemplateObject that the Template Provider was trying to perform a substitution on before instantiation. Can be NULL (when substitution has been performed correctly, but the PutInstance( ) failed). The ErrorStr attribute can contain a hint as to what caused the error. This property is used to contain extra error information (can be NULL). TemplateBuilder is the builder object that the template provider was working on when the error occurred. TemplateObject is the object that is instantiated by the builder. All substitutions will have been performed at this point. Can be NULL (when there is an error in substitution). The ExtendStatus field allows the error object (if any) resulting from a failed instantiation of a TemplateBuilder. This error object is created by the provider that is the instance provider for the object held in the TemplateBuilder. Can be NULL ( if there is an error in substitution or if the provider that backs the template object does not return an extended error object). In the case of nested templates, the ExtendedStatus object could be another instance of TemplateErrorStatus.

Correlation Templates

As discussed above, template functionality is independent of the updating consumer functionality. There are, however, two important advantages with using WMI Templates when constructing low-level correlation scenarios. These advantages are:

Parameterization—Low-level correlation scenarios can be parameterized so that they can apply across arbitrary input parameters. For example, one can construct a 'throughput' template that can be applied to any numeric property of any class.

Manageability—A single template instance can represent all the instances that make up a low level correlation scenario (updating consumer instance, event filters, bindings, etc.). This means that manipulation of this instance affects all the instances of the scenario. For example, one can activate, deactivate, or delete a template instance, thereby activating, deactivating, or deleting all the instances associated with the low-level correlation scenario.

There are different ways in which templates can be used with WMI Event Correlation, such as Correlation Helper Templates and Correlation Scenario Templates.

Correlation Helper Templates

A template can be used to parameterize a particular aspect of a correlation scenario. In this role, the template does not define a complete correlation scenario. A distinguishing characteristic of this type of template is that it does not define any correlation state. Although this type of template is referred to as a "correlation helper template", it can be used in situations other than event correlation situations.

An example of a correlation helper template is one that handles the instantiation of EventFilter and FilterToConsumerBinding instances given a consumer ref and filter query string.

Correlation Scenario Templates

A correlation scenario template is one that encapsulates a specific correlation scenario. Unlike a correlation helper template, a correlation scenario template is autonomous. It maintains its own correlation state and is comprised of correlation primitives, correlation helper templates, and even other correlation scenario templates. A desirable feature of the correlation scenario templates is that they can act as building blocks that a high-level user (e.g., a system administrator) can assemble to create a larger, more complex, correlation scenario template. In order to realize this goal, correlation scenario templates must be designed with well-defined characteristics that allow them to be combined in many, often unpredictable, ways.

Correlation Helper Template Design Guidelines

There are a few guidelines for developing helper correlation templates. Theses guidelines consist of a set of qualifiers that can aid tools that support instantiation of helper correlation templates. Since correlation template instantiation will mostly be instantiated by correlation scenario templates, these qualifiers (shown below in Table 2) will most likely be used for correlation scenario template design.

TABLE 2

| Description | Class-Level | Description String |
|---|---|---|
| crln_data_query | Prop-Level | valid WQL data query |
| crln_update_query | Prop-Level | valid UpateQL query |
| crln_event_query | Prop-Level | valid WQL event query |
| crln_namespace | Prop-Level | valid namespace |
| crln_classname | Prop-Level | valid class name |
| crln_condition | Prop-Level | valid WQL expression for constraints |
| crln_domain | Prop-Level | valid WQL expression for restricting the domain of an input |
| crln_propname | Prop-Level | valid property name |
| crln_delay_tol | Prop-Level | Interval expressed in floating point seconds |
| crln_interval | Prop-Level | Interval expressed in floating point seconds |

All property level qualifiers can optionally contain a 'grouping' name as a value. This value allows different aspects of a common entity to be related. For example, a class name and property name may be related using a grouping identifier.

Domain and Condition Expressions

A domain expression is one that restricts the domain of the template input. An example of a domain expression might be Name='Foo'. This domain expression tells the template to only consider instances having a scenario property of 'Foo'. A condition expression is one that identifies a particular condition of the template input that is of interest to the template. An example of this might be a template which performs actions on transition into a 'True' and 'False' state. The condition describing the True state is specified by a condition expression. The template can then automatically determine the False state by performing a NOT(condition_expression). The distinction between a domain expression and a condition expression allows efficient filtering to be performed by the correlation template.

For example, imagine that there was only one expression passed to the template described above.

(Name='Foo' OR Name='Bar') AND Prop1>50

Here, the domain expression would normally be Name='Foo' OR Name='Bar' and the condition expression would be Prop1>50. The implementation of the template is interested when Prop1 goes below 50 as well so it could perform the action that corresponds to the FALSE state. A template could do this through an event filter expression such as:

Select * from InstanceModificationEvent where TargetInstance ISA 'MyClass' AND NOT(%PropScopeExpr%)

But, this means that the updating consumers subscribed to this event will be indicated for instances that do not have a name 'Foo' or 'Bar'. The correct way to issue this query would be to split the domain and condition expressions and form a filter such as:

Select * from InstanceModificationEvent where TargetInstance ISA 'MyClass' AND %ScopeExpr% AND NOT (%PropExpr%)

Correlation Helper Template Example

The following is an example of a correlation helper template:

```
/*********************************************************************
ConsumerFilterBindingTemplate
**********************************************************************
/
[
    dynamic,
    provider ("Microsoft WMI Template Provider"),
    description ("Creates a Binding and EventFilter given a Consumer and"
                 "Event Query.")
]
class ConsumerFilterBindingTemplate : MSFT_CorrelationHelperTemplate
{
    [NotNull] EventConsumer ref Instruction;
    [crln_event_query, NotNull] string FilterQuery;
    boolean DeliverSynchronously;
};
instance of MSFT_TemplateBuilder
{
    Name = "FilterCreation";
    Template = "ConsumerFilterBindingTemplate";
    Target = instance of EventFilter
        {
            /* Use the Id of this template (which is unique among all
correlation templates, as the Id of the filter. ) */
            [tmpl_prop_val ("Id")] Name;
            /* Use the value FilterQuery property to set the Query property
on the target filter object */
[tmpl_prop_val ("FilterQuery")] Query;
            QueryLanguage = "WQL";
        };
    Order = 1;
};
instance of MSFT_TemplateBuilder
{
    Name = "BindingCreation";
    Template = "ConsumerFilterBindingTemplate";
    Target = instance of FilterToConsumerBinding
        {
            /* This refers to the relpath of the target instance created by
the Filter Creation builder. Note that when doing this, you must ensure
that this builder is instantiated after the FilterCreation builder.
This is done using the Order property on the builder. */
            [tmpl_prop_val ("BUILDER. FilterCreation. RELPATH")] Filter;
            [tmpl_prop_val ("Instruction")] Consumer;
            [tmpl_prop_val ("DeliverSynchronously")] DeliverSynchronously = FALSE;
        };
    Order = 2;
};
```

Correlation Scenario Template Design Guidelines

Correlation scenario templates parameterize correlation scenarios. Thus, correlation scenario templates should follow all the guidelines for designing scenarios using correlation primitives. They should also follow the guidelines for designing helper correlation templates. Design guidelines for correlation scenario templates impose even more structure than helper correlation template design so that templates can be easily composed. There are two categories of correlation scenario templates. These are ones that use events as their input (event-based) and ones that use a data set as their input (data-based).

Event-Based Correlation Scenario Templates

Event-based correlation scenario templates allow for the correlation of events. With event-driven scenarios, users are concerned with things such as how often an event occurs, if the event has occurred within a certain amount of time, etc. An important characteristic of event-driven correlation scenario templates is that they typically do not need to be initialized. An event occurs and its action is taken immediately (or soon thereafter). Typically, the user is unable to discover the state of the inputs to this scenario, since events occur instantaneously and cannot be reviewed at some later time.

Data-Based Correlation Scenario Templates

Although all correlation actions are taken as a result of some event (such as a WMI event), the input to a certain class of correlation scenario templates is better described by a data set description. Also, since data exists in the real world, part of the correlation scenario template implementation is concerned with going out and discovering the current state of the data. A data-driven correlation scenario template is concerned with things such as whether A met a particular condition for 5 minutes or what is the trend of A, etc. There are two subtypes of data-based correlation scenario templates, property-based and condition-based.

Property-Based

Property-based correlation scenario templates are concerned with a specified property of the data set. This means that the scenario will maintain some state that is related to the value of the specified property. Examples of this type of scenario are trend or average correlation templates. These scenarios would be concerned with keeping the average or trend of a specified property. Property based correlation scenario templates usually require the property be of a certain type. For example the trend or average updating consumer scenario would require the property to be one of the numeric types.

Condition-Based

A condition-based correlation scenario template is concerned with watching a specified condition. This means that the scenario will keep some state that is based on the truth value of the condition over the specified data set. Examples of this type of scenario is seeing if a certain condition holds over each element of the data set for a specified amount of time, if a certain condition holds for a specified number of elements of the data set at any given time, etc.

Correlation scenario templates formally declare their input and output using class level qualifiers. The following table describes examples of these class level qualifiers.

TABLE 3

| | | |
|---|---|---|
| crln_arity | Class | Value is an integer specifying the number of inputs |
| crln_type | Class | Value must be DataProperty, DataCondition, or Event |
| crln_output_class | Class | Value is the name of the 'public' state of the scenario |

The output data instances can be determined by using the class name of the output class qualifier and constructing the following query:

Select     *     from     OutputClass     WHERE Scenario='ScenarioName'.

Correlation Scenario templates also define one or more property level qualifiers that can appear on a template class property. This property is called the correlation Id property. A Correlation Id is the unique id of the state instances of a correlation scenario. This id is usually determined from the id of the data or the events that the state instances represent. The correlation Id property is the name of the property of the data or event that has a value that can be used as the correlation Id. The name of this property, as input to a correlation scenario template, helps the template implementation derive a unique id for the correlation state instances. For correlation scenario templates having multiple instances per scenario, this id will typically be the relative pathname of the data instance it represents. Some scenarios have only a single instance per scenario. In these cases, the correlation Id will most likely be the class name of the data instance(s) it is representing.

An important point about correlation Ids is that the they need to be the id of the 'real-world' data instance it represents. In the cases where there is a single correlation scenario template having state representing 'real-world' data instances, this previous statement is obvious. However, when correlation scenario templates have state that represents the data instances of other correlation scenario templates (known as "layered correlation scenario templates"), the correlation Ids must be that of the original 'real-world' data instances, not of the immediate correlation data instances. In other words, the Id of the 'real-world' data instance must be propagated when layering correlation scenario templates. This rule allows correlation templates to be combined later using joining correlation scenario templates.

Correlation Scenario Template Example

```
// Example classes and instances.
class ExampleClass
{
    [key] string Name;
    boolean Prop;
};
instance of ExampleClass
{
```

-continued

```
        Name = "A";
        Prop = TRUE;
};
instance of ExampleClass
{
        Name = "B";
        Prop = FALSE;
};
// the correlation scenario definition
[ dynamic, provider ("Microsoft WMI Transient provider")]
class ExampleCorrelationState : MSFT_CorrelationStateBase
{
        boolean ReceivedEventA;
        boolean ReceivedEventB;
        [trns_egg_timer] uint32 Timer;
};
Class BothAandBEvent : MSFT_UCEventBase
{
        string Name;
};
/* the template class */
[dynamic, provider ("Microsoft WMI Template Provider")]
class SimpleCorrelationTemplate : MSFT_CorrelationScenarioTemplate
{
        [crln_event_query] string EventQueryA;
        [crln_event_query] string EventQueryB;
};
/* the template builders */
instance of MSFT_TemplateBuilder
{
        Name = "InitializerUC";
        Template = "SimpleCorrelationTemplate";
        Target = instance of MSFT_UpdatingConsumer
        {
                /* this naming scheme allows a user to determine the entire
ancestry of a template instance. The scope is the name of the parent
template. In our case, there will not be a parent template, but
templates should be designed with this in mind. Since the element
being created is an atomic instance (not a template) the scope and the
name fit into the name property. Note that this naming scheme is
optional and is purely for browsability. The real keys of target
instances will usually be keyholed. For instance, the key for an
updating consumer, the 'Id' parameter is keyholed here. This approach
keeps keys a reasonable size, which can be important, especially when
there are many nesting levels. */
                [tmpl_subst_str ("%Scope%!%CLASS%=%Name%!Initializer")] Name;
                /* The Scenario should always be the Id of the creating
template. Following this rule allows a user creating the template to
know what the scenario property of the state instances will be. */
                [tmpl_prop_val ("Id")] Scenario;
                /* When updating correlation state, again we use the Id of the
template as the scenario property of the state. This will allow
multiple instances of this template to be created with having their
state instances conflict with one another */
                [tmpl_subst_str{ "INSERT INTO ExampleCorrelationState "
                        "( Id, Scenario, "
                        "ReceivedEventA, ReceivedEventB, Timer) "
                        "( 'ExampleCorrelationTemplateState', "
                        "'%Id% ', FALSE, FALSE, 0) "}] Commands;
        };
};
instance of MSFT_TemplateBuilder
{
        Name = "EventAUC";
        Template = "SimpleCorrelationTemplate";
        Target = instance of MSFT_UpdatingConsumer
        {
                [tmpl_subst_str ("%Scope%!%CLASS%=%Name%!SetEventA")] Name;
                [tmpl_prop_val ("Id")] Scenario;
                [tmpl_subst_str{ "UPDATE ExampleCorrelationState "
                        "SET ReceivedEventA = TRUE, Timer = 5 "
                        "WHERE Scenario = '%Id%' " }] Commands;
        };
};
instance of MSFT_TemplateBuilder
{
        Name = "EventBUC";
        Template = "SimpleCorrelationTemplate";
        Target = instance of MSFT_UpdatingConsumer
```

-continued

```
    {
        [tmpl_subst_str ("ExampleCorrelationTemplate=%Name%!SetEventB")]
Name;
        [tmpl_prop_val ("Id")] Scenario;
        [tmpl_subst_str{ "UPDATE ExampleCorrelationState "
            "SET ReceivedEventB = TRUE, Timer = 5 "
            "WHERE Scenario = '%Id%' " }] Commands;
    };
};
instance of MSFT_TemplateBuilder
{
    Name = "TimerExpiredUC";
    Template = "SimpleCorrelationTemplate";
    Target = instance of MSFT_UpdatingConsumer
    {
        [tmpl_subst_str ("%Scope%!%CLASS%=%Name%!SetEventB")] Name;
        [tmpl_prop_val ("Id")] Scenario;
        [tmpl_subst_str{ "UPDATE ExampleCorrelationState "
                "SET ReceivedEventA = FALSE, ReceivedEventB = FALSE "
                "WHERE Scenario = '%Id%'" }] Commands;
    };
};
instance of MSFT_TemplateBuilder
{
    Name = "BothEventsUC";
    Template = "SimpleCorrelationTemplate";
    Target = instance of MSFT_UpdatingConsumer
    {
        [tmpl_subst_str ("%Scope%!%CLASS%=%Name%!BothOccurred")] Name;
        [tmpl_prop_val ("Id")] Scenario;
        [tmpl_subst_str{ "INSERT INTO BothAandBEvent "
                "(Name) ('%Id% ')"}] Commands;
    };
};
/* now use the helper correlation template to help create the filter
    bindings */
instance of MSFT_TemplateBuilder
{
    Name = "TimerExpiredSubscription";
    Template = "SimpleCorrelationTemplate";
    Target = instance of ConsumerFilterBindingTemplate
    {
        Name = "TimerExpired";
        /* When creating low-level templates from within a template,
            append the current scope with the template classname and the
            name to form the scope of the target template. */
        [tmpl_subst_str ("%Scope%!%CLASS% =%Name%")] Scope;
        [tmpl_subst_str ( "SELECT * FROM MSFT_TransientEggTimerEvent "
                "WHERE Object ISA 'ExampleCorrelationState'"
                "AND Object.Scenario = '%Id% '")] FilterQuery;
        /* This refers to the relpath of the target instance created by
the TimerExpiredUC builder. Note that when doing this, the user must
ensure that this builder is instantiated after the TimerExpiredUC
builder. This is done using the Order property on the builder. */
        [tmpl_prop_val ("BUILDER.TimerExpiredUC. RELPATH")] Instruction;
    };
    Order = 2;
};
instance of MSFT_TemplateBuilder
{
    Name = "ScenarioCreation";
    Template = "SimpleCorrelationTemplate";
    Target = instance of ConsumerFilterBindingTemplate
    {
        Name = "ScenarioCreation";
        [tmpl_subst_str("%Scope%!%CLASS%=%Name%")] Scope;
        [tmpl_subst_str( "SELECT * FROM InstanceCreationEvent "
                "WHERE TargetInstance ISA \"MSFT_UCScenario\" "
                "AND TargetInstance. Id = '%Id%'")] FilterQuery;
        [tmpl_prop_val ("BUILDER. InitializerUC. RELPATH")] Instruction;
    };
    Order = 2;
};
instance of MSFT_TemplateBuilder
{
    Name = "ScenarioModification";
    Template = "SimpleCorrelationTemplate";
    Target = instance of ConsumerFilterBindingTemplate
    {
```

```
                Name = "ScenarioModification";
                [tmpl_subst_str ("%Scope%!%CLASS%=%Name%")] Scope;
                [tmpl_subst_str ("SELECT * FROM InstanceModificationEvent "
                        "WHERE TargetInstance ISA \"MSFT_UCScenario\" "
                        "AND TargetInstance. Id = '%Id%'")] FilterQuery;
                [tmpl_prop_val ("BUILDER. InitializerUC. RELPATH")] Instruction;
        };
        Order 2;
};
instance of MSFT_TemplateBuilder
{
        Name = "OnRebootSubscription";
        Template = "SimpleCorrelationTemplate";
        Target = instance of ConsumerFilterBindingTemplate
        {
          Name = "OnReboot";
          [tmpl_subst_str ("%Scope%!%CLASS%=%Name%")] Scope;
          [tmpl_subst_str ("SELECT * FROM MSFT_TransientRebootEvent")]
FilterQuery;
          [tmpl_prop_val ("BUILDER. InitializerUC. RELPATH")] Instruction;
        };
        Order = 2;
};
instance of MSFT_TemplateBuilder
{
        Name = "EventASubscription";
        Template "SimpleCorrelationTemplate";
        Target = instance of ConsumerFilterBindingTemplate
        {
            Name = "EventA";
            [tmpl_subst_str ("%Scope%!%CLASS%=%Name%")] Scope;
            [tmpl_prop_val ("EventQueryA")] FilterQuery;
            [tmpl_prop_val ("BUILDER. EventAUC. RELPATH")] Instruction;
        };
        Order = 2;
};
instance of MSFT_TemplateBuilder
{
        Name = "EventBSubscription";
        Template = "SimpleCorrelationTemplate";
        Target = instance of ConsumerFilterBindingTemplate
        {
            Name = "EventB";
            [tmpl_subst_str ("%Scope%!%CLASS%=%Name%")] Scope;
            [tmpl_prop_val ("EventQueryB")] FilterQuery;
            [tmpl_prop_val ("BUILDER. EventBUC. RELPATH")] Instruction;
        };
        Order = 2;
};
instance of MSFT_TemplateBuilder
{
        Name = "BothEventsOccurredSubscription";
        Template = "SimpleCorrelationTemplate";
        Target = instance of ConsumerFilterBindingTemplate
        {
            Name = "BothOccurred"
            [tmpl_subst_str("%Scope%!%CLASS%=%Name%")] Scope;
            [tmpl_subst_str("SELECT * FROM InstanceModificationEvent "
                "WHERE TargetInstance ISA \"ExampleCorrelationState\" "
                "AND TargetInstance. ReceivedEventA = TRUE "
                "AND TargetInstance. ReceivedEventB = TRUE "
                "AND TargetInstance. Scenario = '%Id%'")] FilterQuery;
            [tmpl_prop_val ("BUILDER. BothEventsUC. RELPATH")] Instruction;
        };
        Order = 2;
};
/*
    builders to create the scenario and scenario association objects.
*/
instance of MSFT_TemplateBuilder
{
        Name = "Scenario";
        Template = "SimpleCorrelationTemplate";
        Target = instance of MSFT_UCScenario
        {
            [tmpl_prop_val ("Id")] Id;
            [tmpl_subst_str ("%Scope%!%CLASS%=%Name%!@")] Name;
        };
        Order = 3;
```

```
};
instance of MSFT_TemplateBuilder
{
    Name = "ScenarioAssocationInfo";
    Template = "SimpleCorrelationTemplate";
    Target = instance of MSFT_UCScenarioAssociationInfo
    {
        [tmpl_subst_str("%Scope%!%CLASS%=%Name%!@")] Name;
        [tmpl_prop_val ("Id")] Scenario;
        [tmpl_subst_str ("SELECT * FROM ExampleCorrelationState "
                "WHERE Scenario = '%Id%'")] Query;
    };
    Order = 3;
};
/* create the instance of the template. This is normally done by the
    user of the template and is not part of the template definition. */
instance of SimpleCorrelationTemplate
{
    Id = "ExampleCorrelationTemPlate";
    Name = "ExampleCorrelationTemplate";
    EventQueryA = "SELECT * FROM InstanceModificationEvent "
            "WHERE TargetInstance ISA 'ExampleClass' "
            "AND TargetInstance. Name = 'A' ";
    EventQueryB = "SELECT * FROM InstanceModificationEvent "
            "WHERE TargetInstance ISA 'ExampleClass' "
            "AND TargetInstance. Name = 'B' ";
};
```

Figure 9:
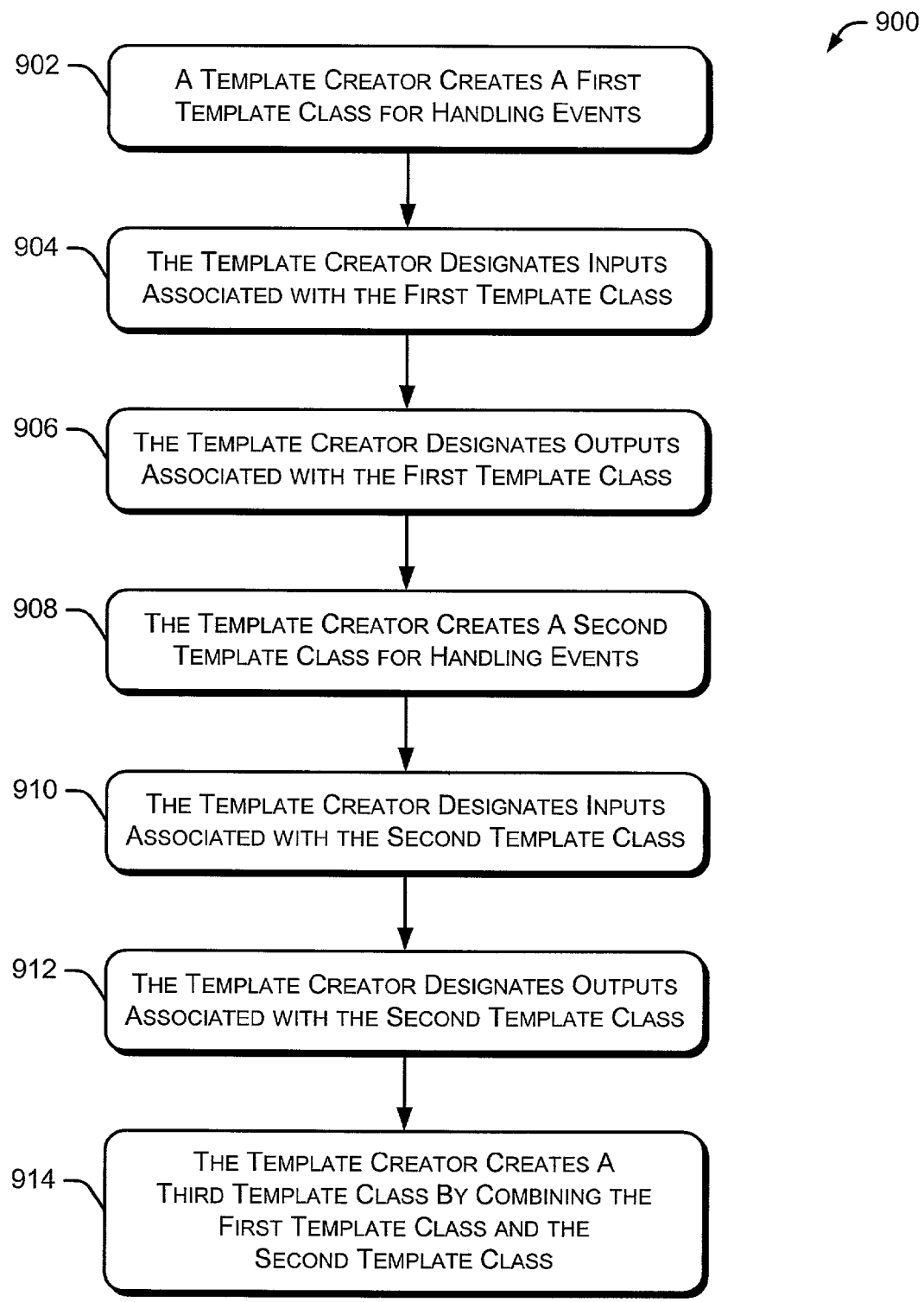
FIG. 9 is a flow diagram illustrating a procedure for combining two templates to create a third template.

FIG. 9 is a flow diagram illustrating a procedure 900 for combining two templates to create a third template. Initially, a template creator creates a first template class for handling events (block 902). The template creator then designates inputs associated with the first template class (block 904) and designates outputs associated with the first template class (block 906). The template creator also creates a second template class for handling events (block 908). The template, creator then designates inputs associated with the second template class (block 910) and designates outputs associated with the second template class (block 912). The template creator creates a third template class by combining the first template class and the second template class (block 914).

An example template class and instances of the template class are provided below.

```
/*********************************************************
 *
    ConsumerFilterBindingTemplate
 *********************************************************
 */
[
    dynamic,
    provider ("Microsoft WMI Template Provider"),
    description ("Creates a Binding and EventFilter given a Consumer and"
"
                "Event Query.")
]
class ConsumerFilterBindingTemplate MSFT_CorrelationHelperTemplate
{
    [NotNull] _EventConsumer ref Instruction;
    [crln_event_query, NotNull] string FilterQuery;
    boolean DeliverSynchronously;
};
instance of MSFT_TemplateBuilder
{
    Name = "FilterCreation";
    Template = "ConsumerFilterBindingTemplate";
    Target = instance of _EventFilter
    {
        /* Use the Id of this template (which is unique among all
correlation
            templates, as the Id of the filter.) */
        [tmpl_prop_val ("Id")] Name;
        /* Use the value FilterQuery property to set the Query property
on
            the target filter object */
        [tmpl_prop_val ("FilterQuery")] Query;
        QueryLanguage = "WQL";
    };
    Order = 1;
```

```
};
instance of MSFT_TemplateBuilder
{
    Name = "BindingCreation";
    Template = "ConsumerFilterBindingTemplate";
    Target = instance of __FilterToConsumerBinding
    {
            /* This refers to the relpath of the target instance created by
the
            Filter Creation builder. Note that when doing this, you
must ensure
            that this builder is instantiated after the FilterCreation
builder.
            This is done using the Order property on the builder. */
            [tmpl_prop_val ("__BUILDER. FilterCreation.__RELPATH")] Filter;
            [tmpl_prop_val ("Instruction")] Consumer;
            [tmpl_prop_val ("DeliverSynchronously")] DeliverSynchronously =
FALSE;
        };
        Order = 2;
};
```

Figure 10:
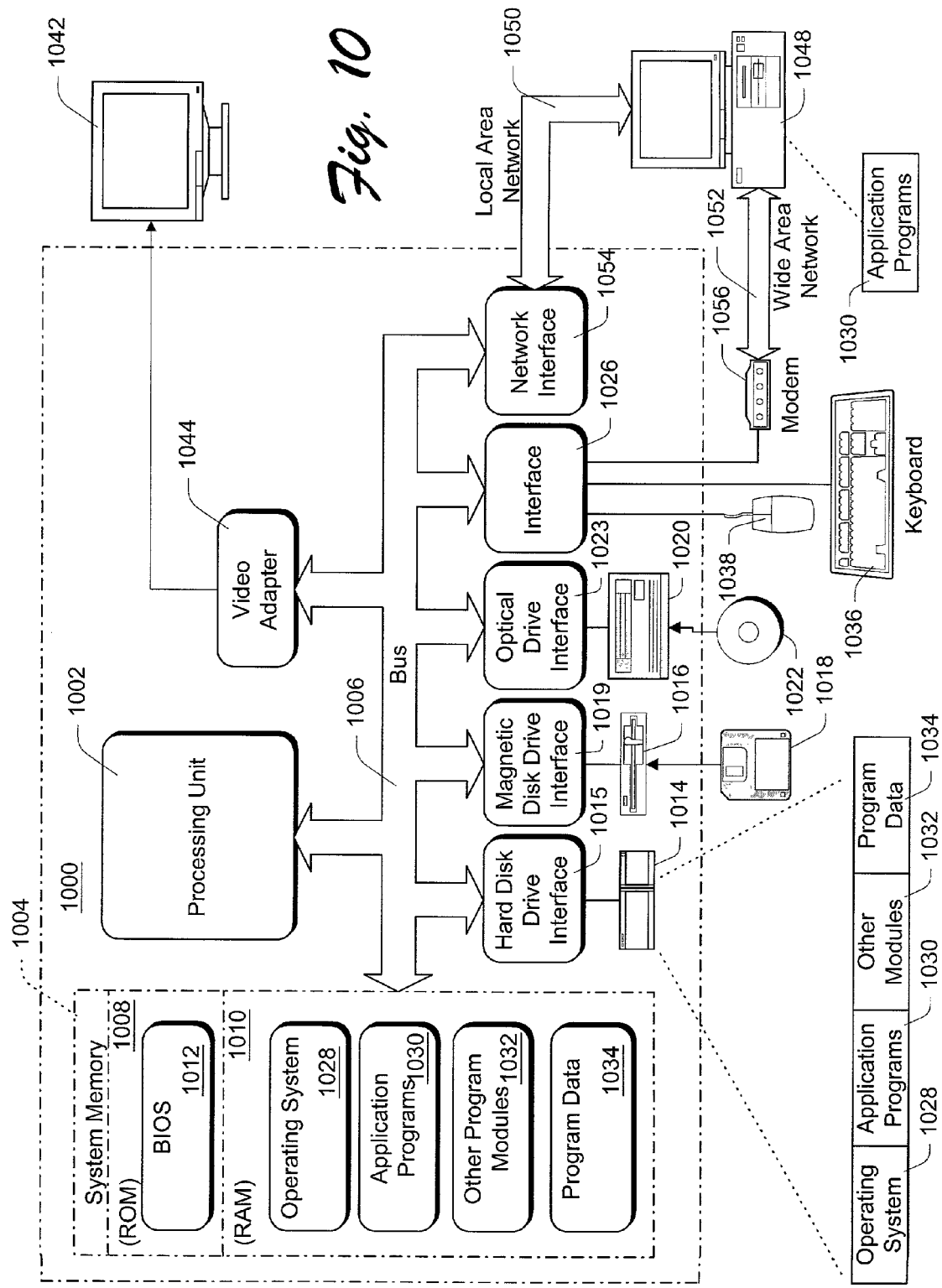
FIG. 10 illustrates an example of a suitable operating environment in which the event distribution and event handling system and method may be implemented.

FIG. 10 illustrates an example of a suitable operating environment in which the template creation system and method may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 10 shows a general example of a computer 1000 that can be used in accordance with the invention. Computer 1000 is shown as an example of a computer that can perform the various functions described herein. Computer 1000 includes one or more processors or processing units 1002, a system memory 1004, and a bus 1006 that couples various system components including the system memory 1004 to processors 1002.

The bus 1006 represents one or more of any of several types of bus structures, including a memory bus or memory controller, a peripheral bus, an accelerated graphics port, and a processor or local bus using any of a variety of bus architectures. The system memory 1004 includes read only memory (ROM) 1008 and random access memory (RAM) 1010. A basic input/output system (BIOS) 1012, containing the basic routines that help to transfer information between elements within computer 1000, such as during start-up, is stored in ROM 1008. Computer 1000 further includes a hard disk drive 1014 for reading from and writing to a hard disk, not shown, connected to bus 1006 via a hard disk drive interface 1015 (e.g., a SCSI, ATA, or other type of interface); a magnetic disk drive 1016 for reading from and writing to a removable magnetic disk 1018, connected to bus 1006 via a magnetic disk drive interface 1019; and an optical disk drive 1020 for reading from and/or writing to a removable optical disk 1022 such as a CD ROM, DVD, or other optical media, connected to bus 1006 via an optical drive interface 1023. The drives and their associated computer-readable media provide nonvolatile storage of computer readable instructions, data structures, program modules and other data for computer 1000. Although the exemplary environment described herein employs a hard disk, a removable magnetic disk 1018 and a removable optical disk 1022, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 1018, optical disk 1022, ROM 1008, or RAM 1010, including an operating system 1028, one or more application programs 1030, other program modules 1032, and program data 1034. A user may enter commands and information into computer 1000 through input devices such as keyboard 1036 and pointing device 1038. Other input devices (not shown) may include a microphone, joystick, game pad, satellite dish, scanner, or the like. These and other input devices are connected to the processing unit 1002 through an interface 1026 that is coupled to the system bus (e.g., a serial port interface, a parallel port interface, a universal serial bus (USB) interface, etc.). A monitor 1042 or other type of display device is also connected to the system bus 1006 via an interface, such as a video adapter 1044. In addition to the monitor, personal computers typically include other peripheral output devices (not shown) such as speakers and printers.

Computer 1000 operates in a networked environment using logical connections to one or more remote computers, such as a remote computer 1046. The remote computer 1046 may be another personal computer, a server, a router, a network PC, a peer device or other common network node, and typically includes many or all of the elements described above relative to computer 1000, although only a memory storage device 1048 has been illustrated in FIG. 10. The logical connections depicted in FIG. 10 include a local area network (LAN) 1050 and a wide area network (WAN) 1052. Such networking environments are commonplace in offices, enterprise-wide computer networks, intranets, and the Internet. In certain embodiments, computer 1000 executes an Internet Web browser program (which may optionally be integrated into the operating system 1028) such as the "Internet Explorer" Web browser manufactured and distributed by Microsoft Corporation of Redmond, Wash.

When used in a LAN networking environment, computer 1000 is connected to the local network 1050 through a network interface or adapter 1054. When used in a WAN networking environment, computer 1000 typically includes a modem 1056 or other means for establishing communications over the wide area network 1052, such as the Internet. The modem 1056, which may be internal or external, is connected to the system bus 1006 via a serial port interface 1026. In a networked environment, program modules depicted relative to the personal computer 1000, or portions thereof, may be stored in the remote memory storage device. It will be appreciated that the network connections shown are exemplary and other means of establishing a communications link between the computers may be used.

Computer 1000 typically includes at least some form of computer readable media. Computer readable media can be any available media that can be accessed by computer 1000. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 1000. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
   creating a template class that stores at least one template parameter, wherein the template class is a correlation helper template that parameterizes a particular aspect of a correlation scenario, and wherein the correlation helper template includes at least one parameter to be defined by a user initiating creation of a new instance of the template class;
   specifying at least one additional object to be created when an instance of the template class is created;
   initiating the creation of a new instance of the template class using the at least one template parameter; and
   if an error occurs during the creation of the new instance of the template class, receiving a report identifying the error.

2. A computer-implemented template description structure comprising:
   at least one template class that stores a plurality of template parameters, wherein the at least one template class is a correlation helper template that parameterizes a particular aspect of a correlation scenario;
   at least one template builder class that identifies at least one additional object to be created with each instance of the template class; and
   at least one order parameter that identifies the order in which the template builder classes are instantiated.

3. One or more computer-readable media having stored thereon a template description structure, the template description structure comprising:
   at least one template class that parameterizes a particular aspect of a correlation scenario;
   at least one template builder class, wherein each instance of the template builder class identifies an object that needs to be created when creating an instance of the template class; and
   at least one order parameter that identifies the order in which the template builder classes are instantiated.

4. One or more computer-readable media as recited in claim 3 wherein each instance of the template builder class has an associated name.

* * * * *